US008296654B2

(12) United States Patent  (10) Patent No.: US 8,296,654 B2
Ahlberg et al.  (45) Date of Patent: Oct. 23, 2012

(54) AUTOMATIC GUIDE FOR DATA ANALYSIS

(75) Inventors: Christopher Ahlberg, Watertown, MA (US); Lars Bauerle, Somerville, MA (US); Tobias Lehtipalo, Västra Frölunda (SE); Rikard Edgren, Göteborg (SE); Anna Lundberg, Sävedalen (SE); Stefan Jernberg, Göteborg (SE); Johanna Altenstedt, Göteborg (SE)

(73) Assignee: Spotfire AB, Gothenburg (SE)

( * ) Notice: Subject to any disclaimer, the term of this patent is extended or adjusted under 35 U.S.C. 154(b) by 492 days.

(21) Appl. No.: 11/173,991

(22) Filed: Jun. 30, 2005

(65) Prior Publication Data

US 2006/0031209 A1  Feb. 9, 2006

Related U.S. Application Data

(60) Provisional application No. 60/585,263, filed on Jul. 1, 2004.

(51) Int. Cl.
  *G06F 3/00*  (2006.01)
(52) U.S. Cl. ......... 715/704; 715/771; 715/808; 715/809
(58) Field of Classification Search ............... 715/704
  See application file for complete search history.

(56) References Cited

U.S. PATENT DOCUMENTS

| | | | | |
|---|---|---|---|---|
| 5,550,964 | A | * | 8/1996 | Davoust ........................ 345/440 |
| 5,600,780 | A | | 2/1997 | Hiraga et al. ................. 345/346 |
| 6,108,004 | A | | 8/2000 | Medl ............................ 395/334 |
| 6,707,454 | B1 | * | 3/2004 | Barg et al. .................... 345/440 |
| 6,927,771 | B2 | * | 8/2005 | Ikami ........................... 345/440 |
| 7,200,804 | B1 | * | 4/2007 | Khavari et al. ................ 715/513 |
| 2003/0030634 | A1 | * | 2/2003 | Sang'udi et al. .............. 345/418 |
| 2003/0212519 | A1 | * | 11/2003 | Campos et al. ............... 702/101 |
| 2003/0212520 | A1 | * | 11/2003 | Campos et al. ............... 702/101 |
| 2004/0021695 | A1 | * | 2/2004 | Sauermann et al. .......... 345/786 |
| 2004/0261026 | A1 | * | 12/2004 | Corson ......................... 715/704 |
| 2006/0005132 | A1 | * | 1/2006 | Herdeg, III ................... 715/704 |

OTHER PUBLICATIONS

Kurlander, D. et al., "A History-Based Macro by Example System," UIST '92, 5th Annual Symposium on User Interface Software and Technology, Proceedings of the ACM Symposium on User Interface Software and Technology, Monterey, Nov. 15-18, 1992, ACM Symposium on User Interface Software and Technology, New York, NY, Nov. 15, 1992, pp. 99-106.

Olsen, D. R. et al: "Macros by Example in a Graphical UIMS," IEEE Computer Graphics and Applications, IEEE Service Center, New York, NY, vol. 8, No. 1, Jan. 1988, pp. 68-78.

Communication Relating to the Results of the Partial International Search, pp. 1-2.

* cited by examiner

*Primary Examiner* — Doon Chow
*Assistant Examiner* — Anil Kumar
(74) *Attorney, Agent, or Firm* — Kristofer E. Elbing

(57) ABSTRACT

A system for analyzing data is disclosed. In one general aspect it includes a data analysis user interface responsive to user interaction to initiate actions on the data. An action logging interface is operative to create a logged sequence of actions as the user initiates them through the data analysis user interface. And a token-based authoring user interface responsive to user selection commands to select action-tokens corresponding to the actions logged by the action logging interface to create an authored set of actions that has an authored sequence that can be different from the logged sequence.

51 Claims, 19 Drawing Sheets

| Settings in Properties dialog for visualization (in DecisionSite): | Settings and titles specified in the Prompt for... dialog: | Resulting Settings for... dialog displayed upon running guide: |
|---|---|---|
| 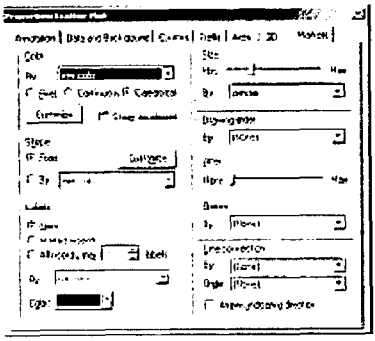 The Properties dialog of a scatter plot. | 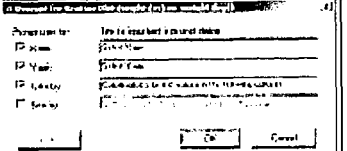 Here, the scatter plot properties that were set to something other than [None], that is, Color and Size, together with the axis-selections, are shown as possible prompts. The creator of this guide has determined that the size should always be set by gender as she specified when she created the original scatter plot, so this check box is not selected in the Prompt for... dialog. | 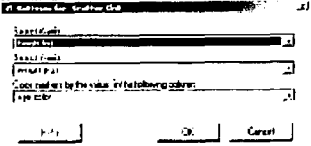 The resulting Settings for... dialog shows the three selected prompt lists upon running the guide. The titles of the lists are the ones entered by the guide creator in the Prompt for... dialog. |
| 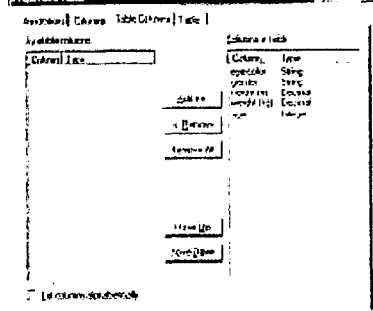 The Properties dialog of a table visualization. | 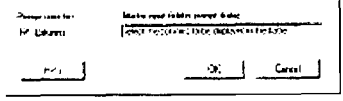 In this case, the only setting that had been modified was the columns displayed in the table. Hence, this is the only item available for prompting in the Prompt for... dialog. | 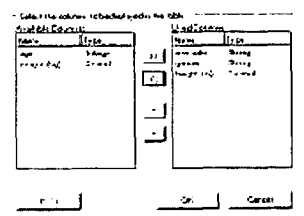 If the selected prompt item is a list of columns, the resulting Settings for... dialog will contain two list boxes where the end user of the guide can move columns from Available Columns to Used Columns using the arrows >> and <<, and also sort the columns with the up and down arrows. |

FIG. 17

AUTOMATIC GUIDE FOR DATA ANALYSIS

CROSS-REFERENCE TO RELATED APPLICATION

This patent application claims the benefit under 35 U.S.C. §119 (e) of U.S. provisional application No. 60/585,263, filed on Jul. 1, 2004, which is herein incorporated by reference.

FIELD OF THE INVENTION

This invention relates to the field of data analysis, including the design of data analysis and visualization systems.

BACKGROUND OF THE INVENTION

The modern world is seemingly flooded with data but is often at a loss for interpreting it. One exceptionally useful tool that has found wide acceptance is software that presents the data in some visual form, especially in a way that makes relationships noticeable. Using this software, often very complex databases can be queried. The results of the queries are then analyzed and displayed in some visual format, usually graphical, such as a bar or pie chart, scatter plot, or any of a large number of other well-known formats. Modern analysis tools then allow the user to dynamically adjust the ranges of the displayed results in order to change and see different aspects of the analysis.

One prominent data visualization product is owned by Spotfire AB of Göteborg, Sweden, and marketed under the name DecisionSite.® In this product, which incorporates the technology disclosed in U.S. Pat. No. 6,014,661 (Ahlberg, et al., "System and method for automatic analysis of data bases and for user-controlled dynamic querying," issued 11 Jan. 2000, and herein incorporated by reference), query devices tied to columns in the data set and different visualizations of the data allow users to dynamically filter their data sets based on any available property, and hence to interactively visualize the data. As the user adjusts graphical query devices such as rangesliders and alphasliders, the DecisionSite® product changes the visualization of the data accordingly.

The DecisionSite® product also includes several other automatic features, such as initial selection of suitable query devices and determination of ranges, which aid the user not only to visualize the data, but also to mine it. When properly used, this technique constitutes a powerful tool that forms the basis for sophisticated data exploration and decision-making applications.

Overall, analysis and visualization products have improved the efficiency and enhanced the capabilities of professionals in a wide range of areas of data analysis. But these individuals are typically highly trained and highly paid, and they can still spend long periods of time in their data analysis tasks. Improvements in the efficiency of data analysis tasks would therefore be of great benefit to individuals working in a variety of areas.

SUMMARY OF THE INVENTION

In one general aspect, the invention features a system for analyzing data from a database that includes a data analysis user interface responsive to user interaction to initiate actions on the data. An action logging interface is operative to create a logged sequence of actions as the user initiates them through the data analysis user interface. And a token-based authoring user interface responsive to user selection commands to select action-tokens corresponding to the actions logged by the action logging interface to create an authored set of actions that has an authored sequence that can be different from the logged sequence.

In preferred embodiments, the authoring user interface can include one or more sequencing controls that operate on the action-tokens. At least one of the sequencing controls can be a selection control operative to select a subset of the logged actions for inclusion in a guide series. The authoring interface can include a selection control operative to select a subset of the logged actions for inclusion in a guide series. The authoring interface can include a reordering control operative to reorder actions referenced in the guide series. The authoring interface can include a grouping control operative to identify groups of actions. The authoring interface can include a group naming control operative to name groups of actions identified by the authoring interface. A guide display can be operative to display at least a portion of the authored set of actions. The authoring interface can include a gating control operative to insert one or more gating constructs into the authored sequence. The authoring interface can include sequencing controls that are responsive to actuation by a pointing device. The sequencing controls can include drop-and-drag controls. The sequencing controls can include promote and demote controls. The authoring interface can include annotation controls responsive to user input to associate user-authored textual annotations to actions in the different sequence. The textual annotations can be visible in a user interface window. The logging can be operative at startup of the system. The logging can be independent of any user logging initiation command. The system can also include a macro interface that performs actions in response to a parsed series of user-editable statements. The system can include a library operative to provide access to a plurality of the authored sequences by more than one user. At least some of the authored sequences can be designated through the server as best practice sequences. The authoring interface can be operative to save authored sets to the library and retrieve them from the library for further authoring. The authoring interface can be operative to save authored sets and retrieve them for further authoring. The authoring interface can be operative to permit the user to create an authored sequence in which at least some of the actions are in a different order than they are in the logged sequence. The authoring interface can permit users to create authored sequences with references outside of the data analysis system. The authoring interface can permit users to create authored sequences with references outside of the data analysis system in which selected data are passed from the data analysis system. The authoring interface can permit users to create authored sequences with references to outside services that return information to the data analysis system. The authoring interface can permit users to create authored sequences with references outside of the data analysis system in which selected data are passed from the data analysis system to an outside service and a result is returned from that service for the selected data. The system can further include an application programming interface that defines a standard for supporting additional actions in the system and wherein the additional actions can be logged and referenced in authored sequences. The authoring interface can permit users to insert hyperlinks to items other than actions into the authored sequence. The authoring interface can permit users to insert references to data to be operated on by the system into the authored sequence. The authoring interface can permit users to insert into the authored sequence references to data in the database to be operated on by the system. The authoring interface can permit users to insert prompts for selection of variables into the authored sequence. The system can include a state engine that stores application states. The data analysis system can include spreadsheet functionality. The data analysis system can include interactive data visualization functionality. The data analysis system can be a statistical package that includes a plurality of advanced statistical functions. The statistical analysis package can include at least two of the following advanced statistical functions: regression, correlation, and analysis of variance. The system can be operative independent of any user-initiated compile command. The authoring interface and the user interface can both be independently accessible at the same time. The authoring interface can further be responsive to user comment command input to insert end-user-readable comments into the authored set of actions. The authoring interface can be responsive to user commands to insert page delimiters in the authored set of actions. The authoring interface can include automatic page navigation logic operative to insert navigation links between pages in response to the insertion of page delimiters. The authored set of actions can be stored as a structured document. The authored set of actions can be stored in a structured text format that can be modified by the end user. The action-tokens can be hierarchical and can include other action-tokens. The database can be stored as a delimited file.

In another general aspect, the invention features a system for analyzing data from a database that includes a data analysis user interface responsive to user interaction to initiate actions on the data, and an action logging interface operative to create a logged sequence of actions as the user initiates them through the data analysis user interface. Mapping logic is operative to map one or more of the actions to an action-token, and a token access user interface is operative to present a selection of token controls corresponding to tokens mapped by the mapping logic to the user and responsive to user-actuations of selected ones of the controls to allow for random access to the actions corresponding to the selected tokens after the step of logging.

In preferred embodiments, the token access user interface can be an authoring user interface responsive to token selection commands to select actions from the logged sequence to create an authored set of actions that has an authored sequence that can be different from the logged sequence.

In a further general aspect, the invention features a data analysis method that includes automatically logging a sequence of data analysis actions on data from the database as they are initiated by a user, associating action-tokens with each of the actions logged in the step of automatically logging, receiving token-based user authoring commands from a user, and storing an authored sequence of actions selected by the user and for which token-based authoring commands were received by the step of receiving.

In another general aspect, the invention features a system for analyzing data from a database that includes means for automatically logging a sequence of data analysis actions as they are initiated by a user, means for associating action-tokens with each of the actions logged in the step of logging, means for receiving token-based user authoring commands from a user, and means for storing an authored sequence of actions selected by the user and for which token-based authoring commands were received by the means for receiving.

Systems according to the invention recognize that the process of analyzing a complex data set usually involves many steps as a user explores the effects of different input parameters and data fields, different filters, different analysis algorithms, different display options, etc. The data visualization process is also intended to be as easy for a user to use as possible, and since the user presumably has more productive work to do, it is seldom that a user will keep track of which actions he took to create a given visualization. This then makes it hard not only for him or her to reproduce the analysis for him- or herself, but also to report it to others in a way that they can use to reproduce the analysis and perhaps modify, augment or omit some of the actions, to perform the same actions on a different data set, etc. Moreover, an inability to completely or at least sufficiently record the actions taken to analyze a data set also makes it difficult or impossible to meet requirements for publishing "best practices" documentation, or for meeting some regulatory demands.

Some existing applications that perform at least simple data analysis include some facility for recording actions. Microsoft Excel®, for example, has a macro tool that records actions. This tool runs in the background, however, and is a "black box" from the perspective of a user, such that it records past actions, but does not guide the user—or a different user—to produce future results. Furthermore, these existing applications are not related to interactive graphical presentation of analyzed data.

BRIEF DESCRIPTION OF THE DRAWINGS

FIG. 17 is a diagram showing visualization settings prompts for the system of FIG. 1;

DETAILED DESCRIPTION OF AN ILLUSTRATIVE EMBODIMENT

Referring to FIGS. 1-7, an illustrative embodiment of the invention is included in the Analysis Builder guide building feature of the DecisionSite® data analysis and visualization software system developed by Spotfire, Inc. This feature provides action-logging and guiding functionality with a graphical user interface that can be integrated into or will augment existing data analysis software, especially of the type that visualizes data, such as the DecisionSite® system. The principles of the invention may also be applied to other data analysis and visualization packages, however, with modifications that are within the abilities of one of ordinary skill in the art to the extent that they are needed.

When the user activates the guide building feature, it creates a log of all user actions that affect the analysis. Actions may be of any type, from selecting and opening one or more data sets to choosing analysis routines and visualization options. The user can also edit the log as desired before or even after saving it. The invention also allows the user to add comments, to group and label actions intuitively, and to add links to external network resources such as web sites.

Once the log is saved it can be used as is, for purpose of pure documentation, or it can be exported to others, for example by e-mail as an XML file, in which case it acts as a guide to recreating the analysis, with the option of additional modification by other users. The log can also be stored in a library, optionally with a list of those who are allowed access to it. This allows others to run it, or use it as a basis for building further guides.

Figure 1:
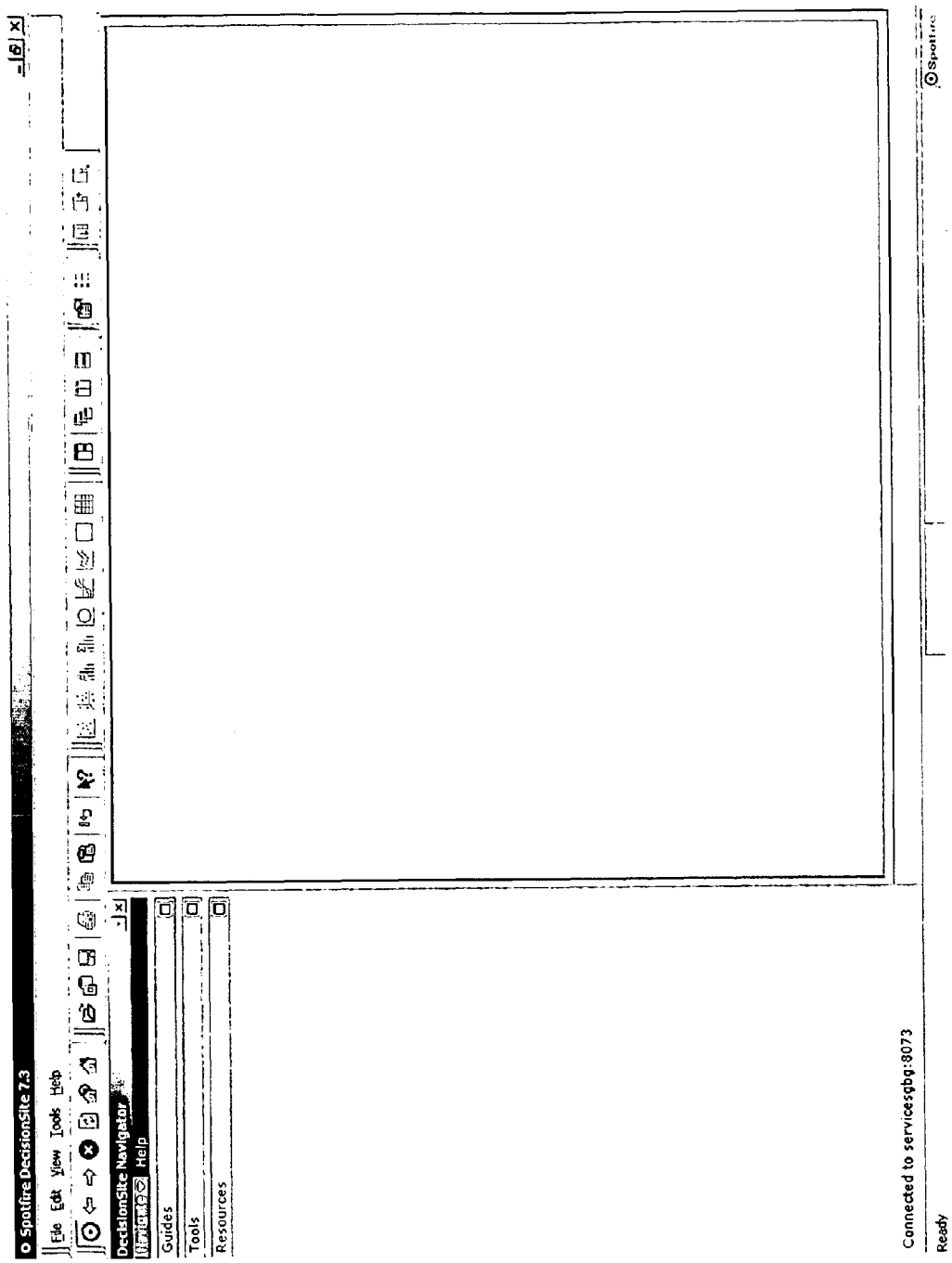
FIG. 1 shows an initial screen for a data analysis and visualization system according to the invention.
Figure 2:
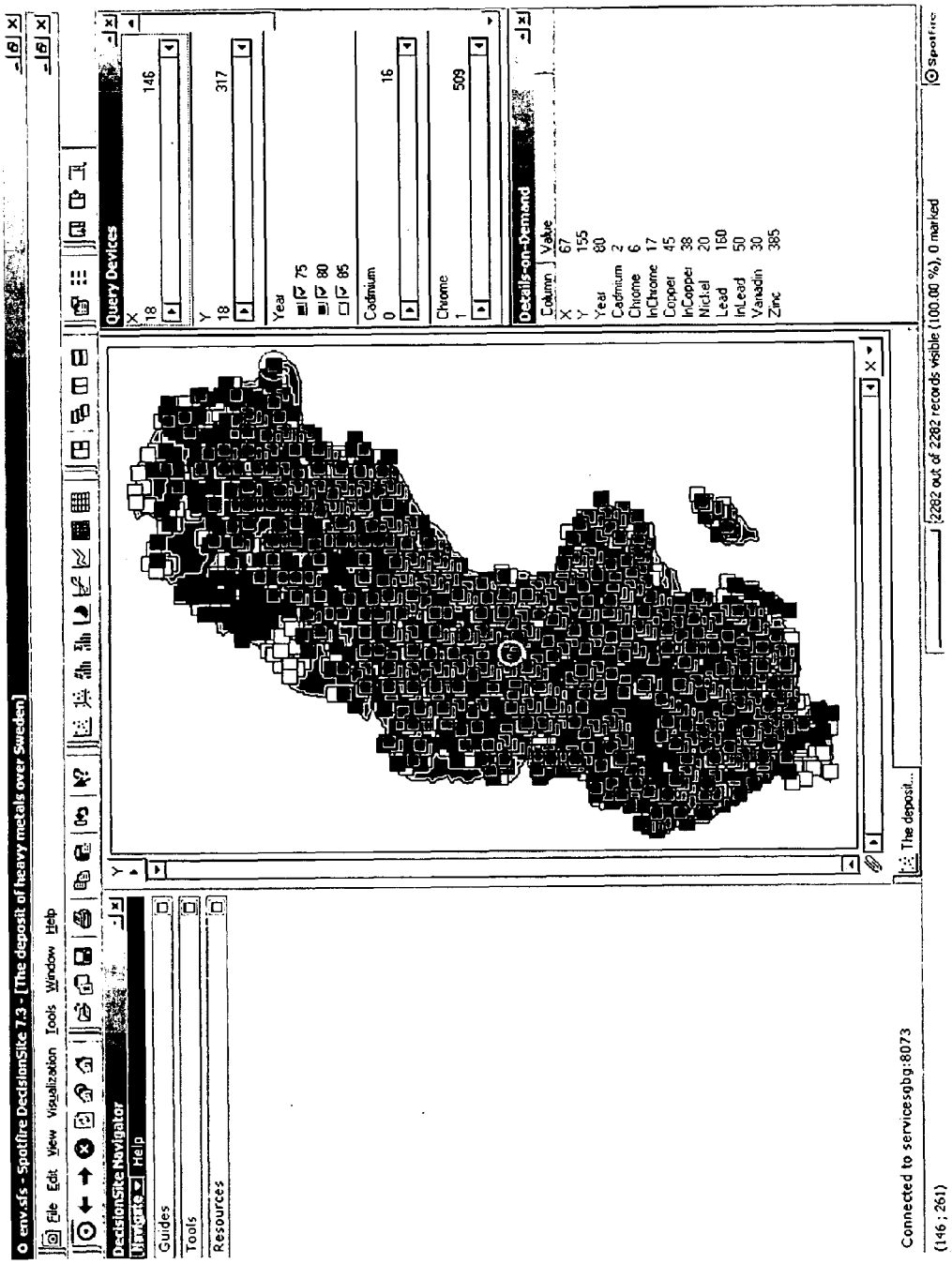
FIG. 2 shows a screen for the system of FIG. 1 in which a user has opened a data set and has selected a scatter-plot visualization plotting nickel concentrations at various X-Y points in Sweden during three different measurement years.
Figure 3:
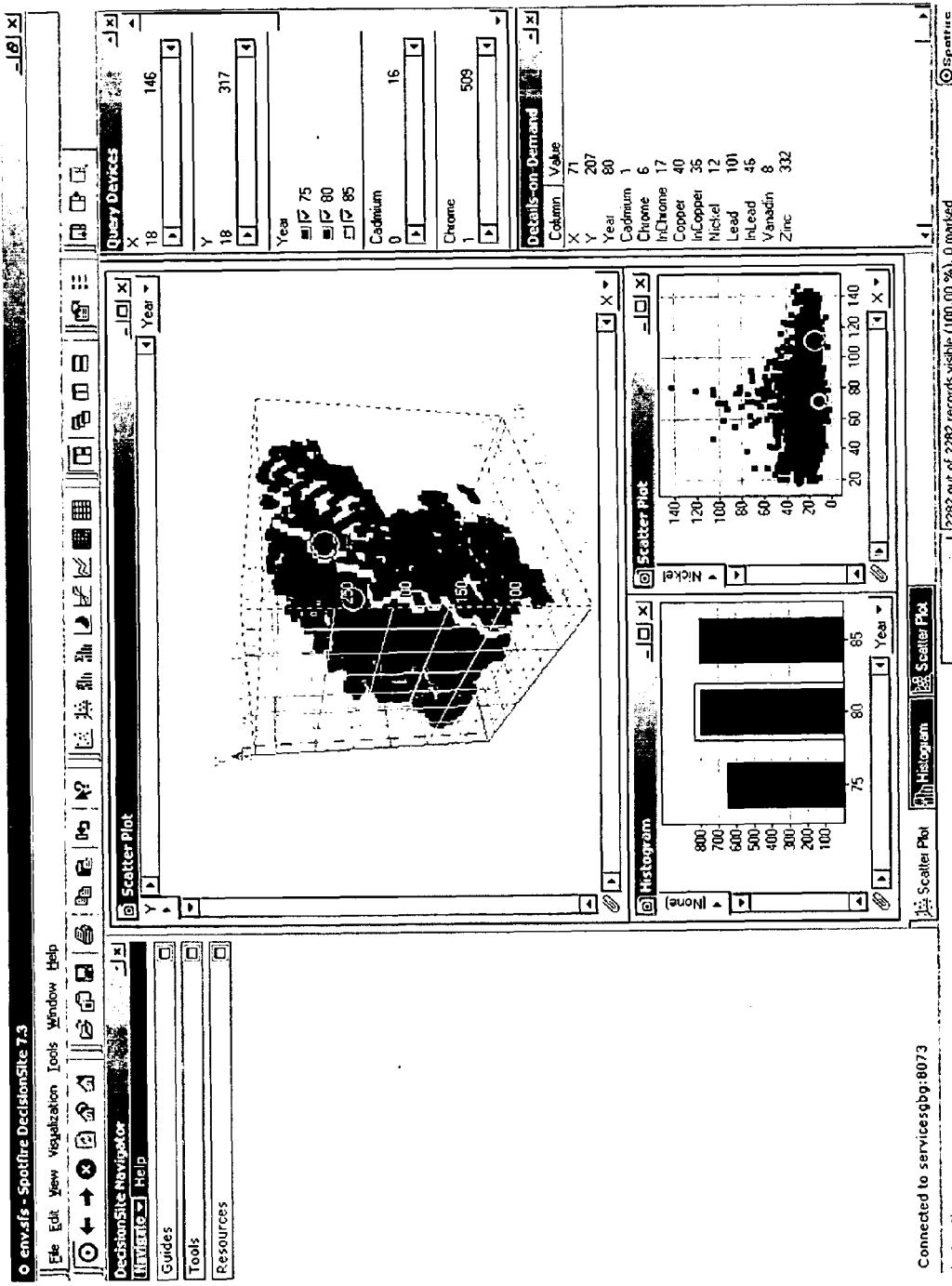
FIG. 3 shows a screen for the system of FIG. 1 in which the user has selected a visualization that includes a scatter plot of the form X vs. Y vs. Year, as well as a histogram of measurements per year and a scatter plot of Nickel vs. X.
Figure 4:
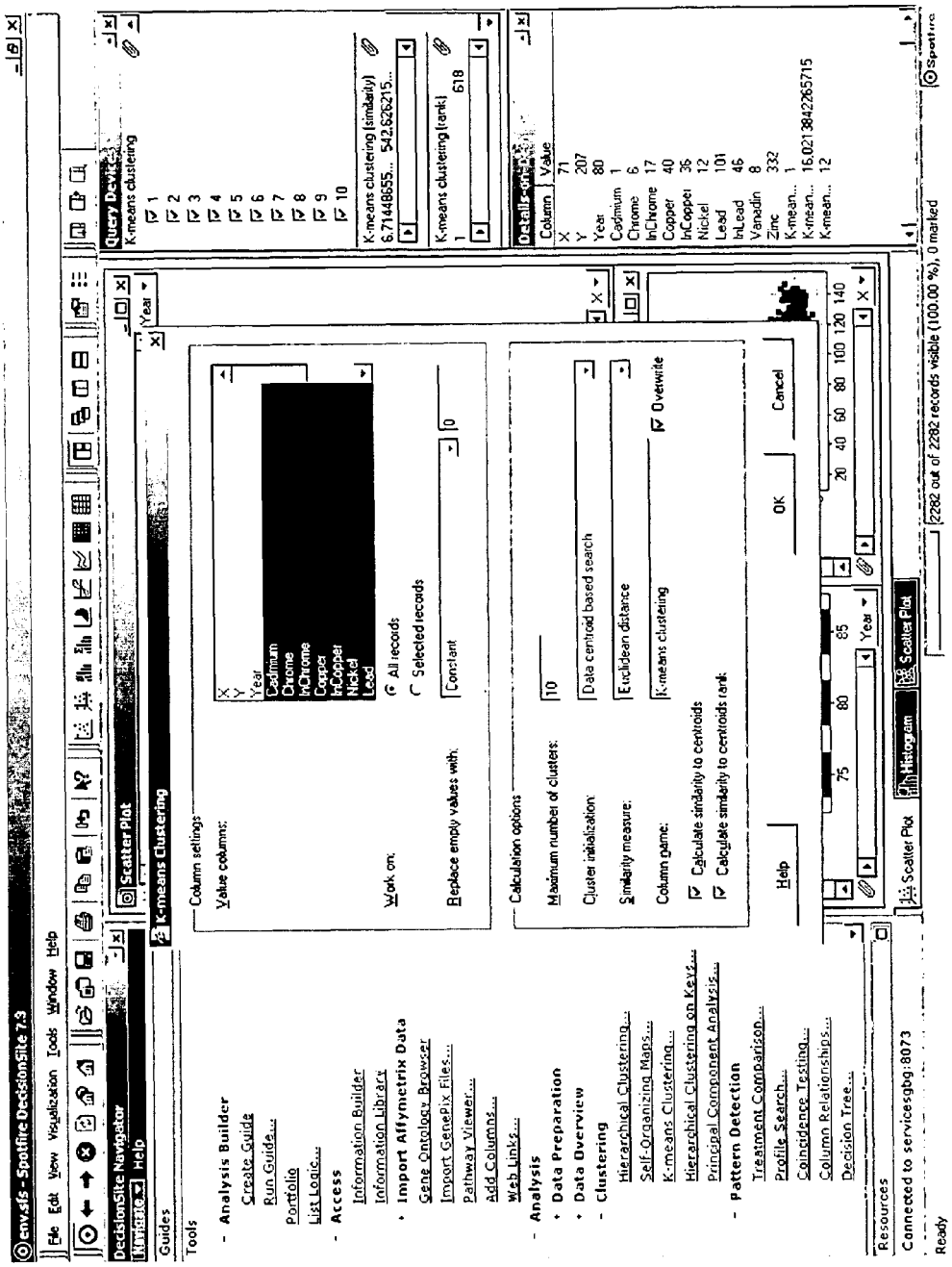
FIG. 4 shows a screen for the system of FIG. 1 in which the user has selected K-means clustering of the data.
Figure 5:
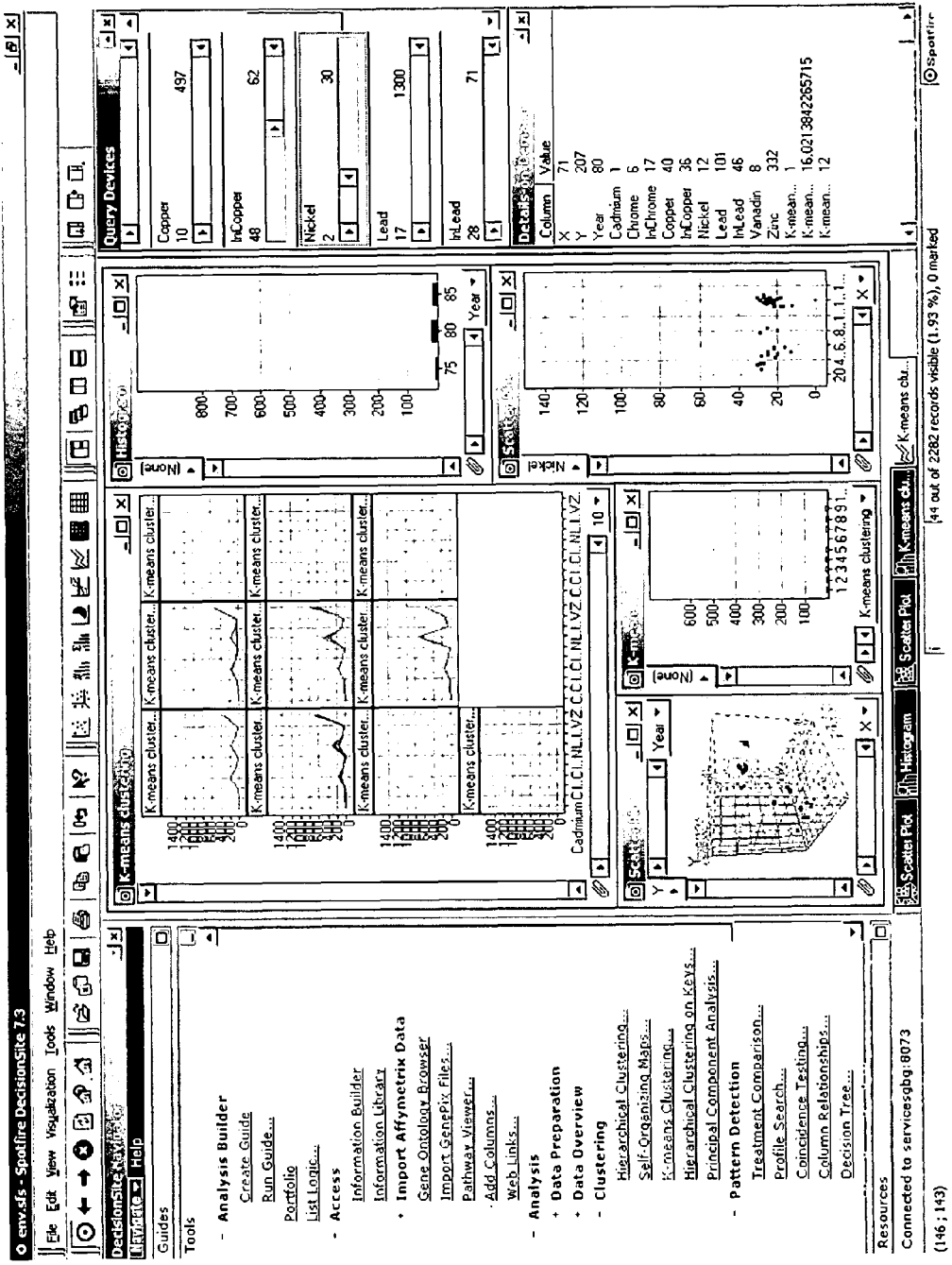
FIG. 5 shows a screen for the system of FIG. 1 in which the DecisionSite® analysis routine generates the K-means clustered date selected in FIG. 4.

FIGS. 1-7 illustrate a typical data analysis session: in FIG. 1, a user has launched the analysis software and is presented with an initial screen. In FIG. 2, the user has opened a data set and has selected a scatter-plot visualization plotting nickel concentrations at various X-Y points in Sweden during three different measurement years. In FIG. 3, the user has selected a visualization that includes a scatter plot of the form X vs. Y vs. Year, as well as a histogram of measurements per year and a scatter plot of Nickel vs. X. In FIG. 4, the user has selected K-means clustering of the data, which the DecisionSite® analysis routine generates accordingly, as shown in FIG. 5. FIG. 5 also illustrates how the user has selected and set certain query device filters for Copper, InCopper, Nickel, and Lead.

Figure 6:
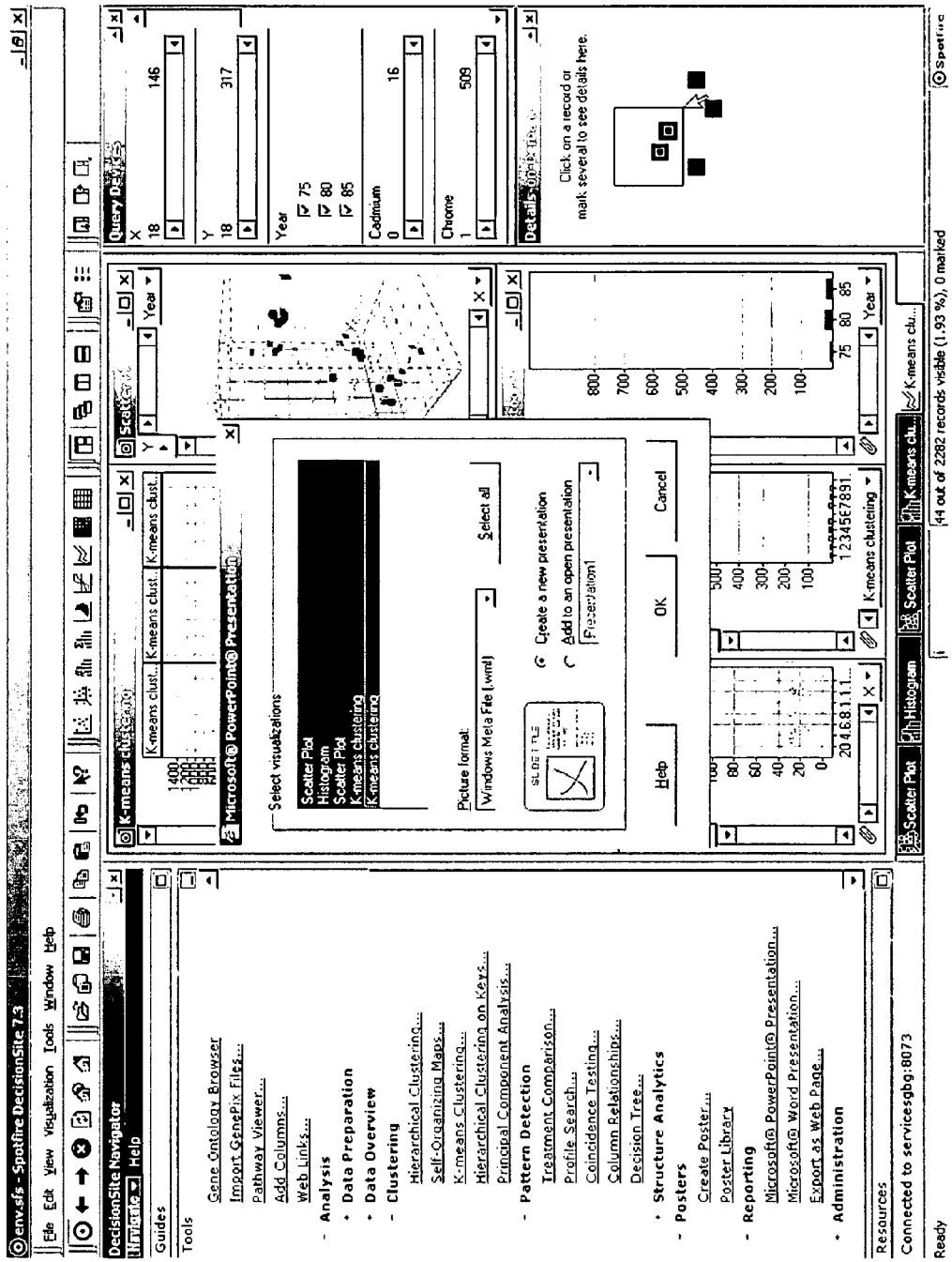
FIG. 6 shows a screen for the system of FIG. 1 in which a user selects the creation of a PowerPoint® presentation.
Figure 7:
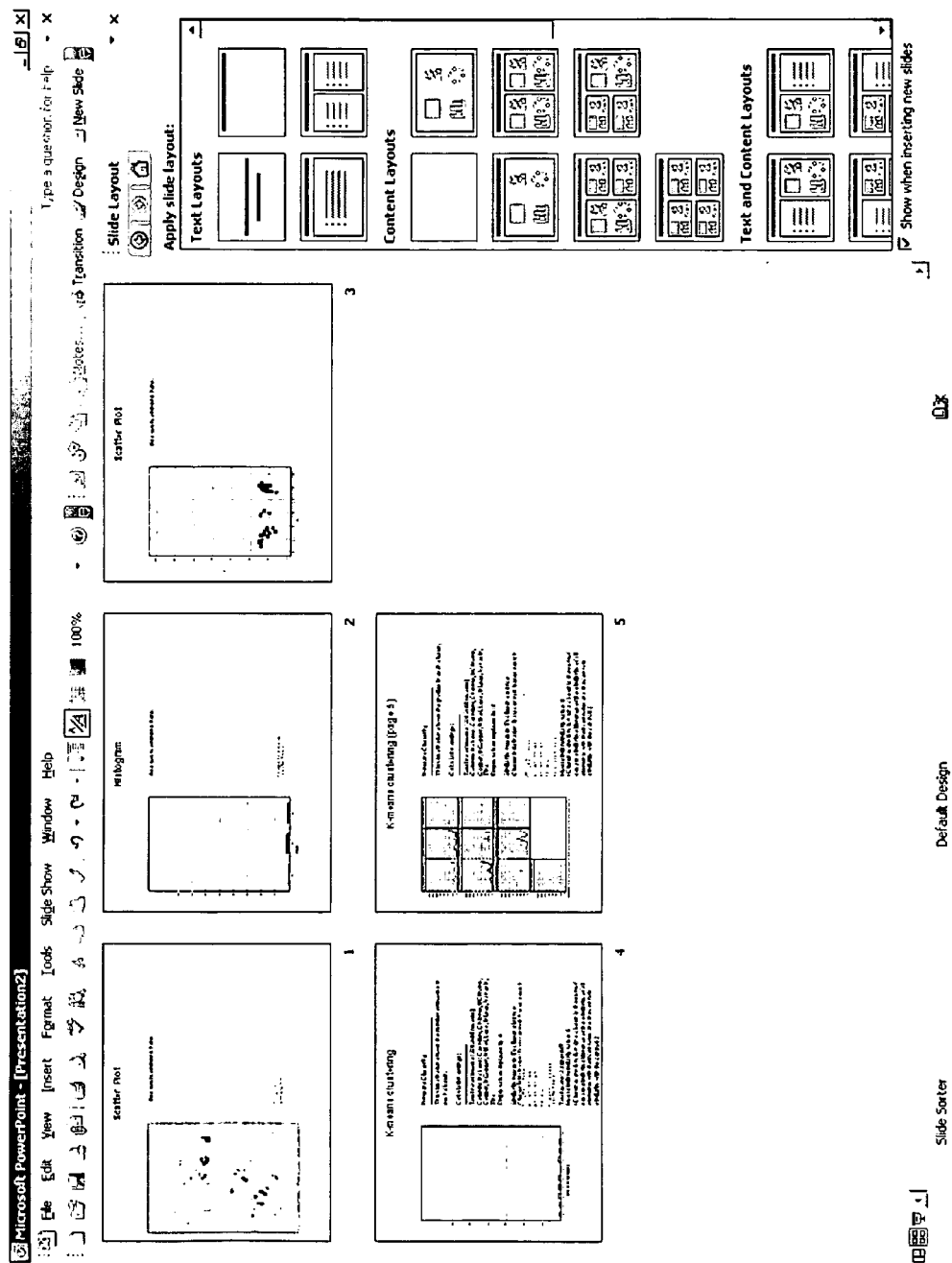
FIG. 7 shows the PowerPoint® presentation created in connection with FIG. 6.

One feature of the DecisionSite® system is that it will automatically generate a slide presentation of the various visualizations in Microsoft PowerPoint, as is illustrated in FIGS. 6 and 7.

In proceeding from initialization to final presentation, the user will have performed several actions: Opening a data set; selecting scatter plots and a histogram; initiating K-means clustering according to chosen parameters; setting query device filters; and instructing the system to generate the PowerPoint presentation.

Figure 8:
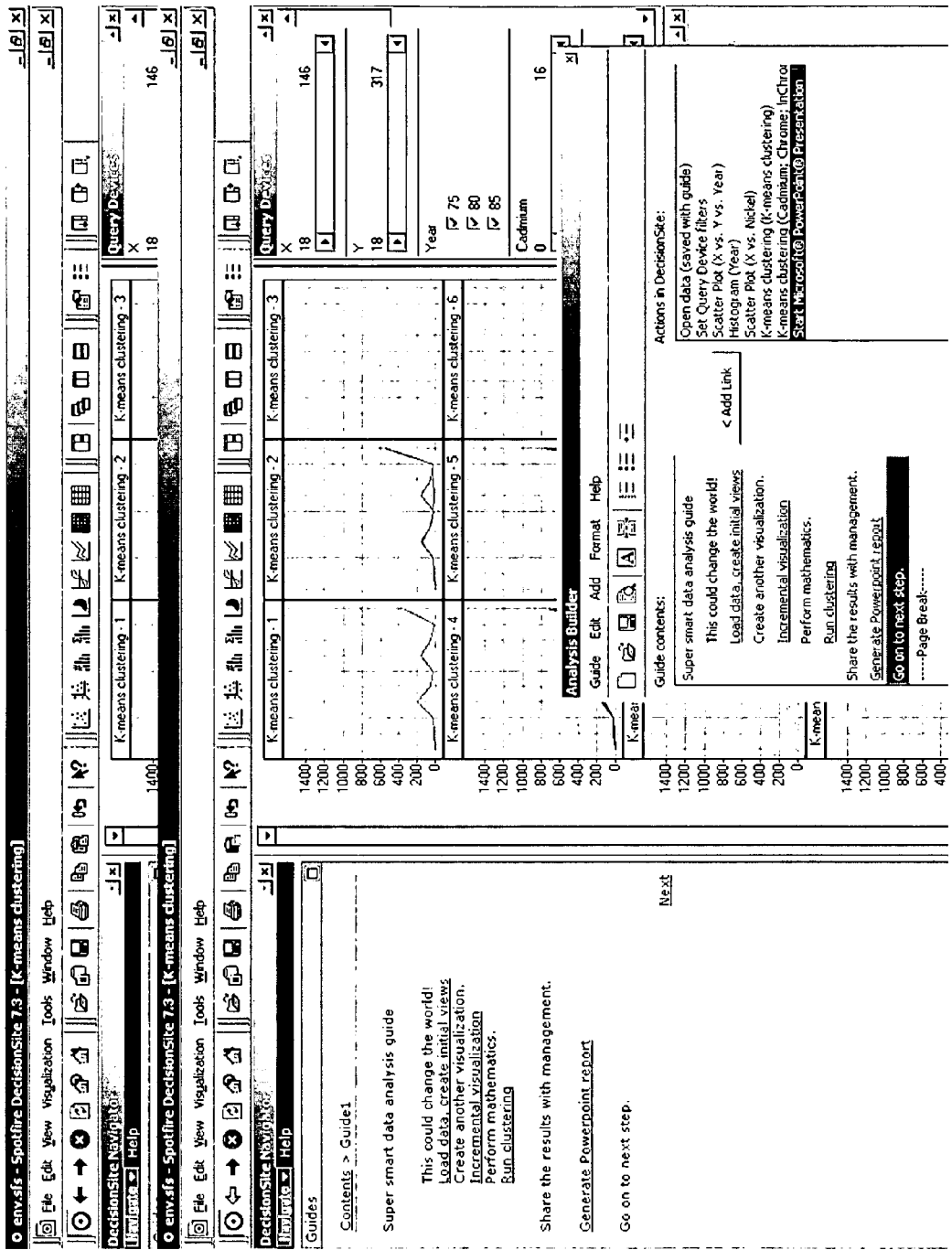
FIG. 8 shows a screen for the system of FIG. 1 with the Analysis Builder guide building tool that lists logged actions for the session illustrated in FIGS. 1-7.
Figure 9:
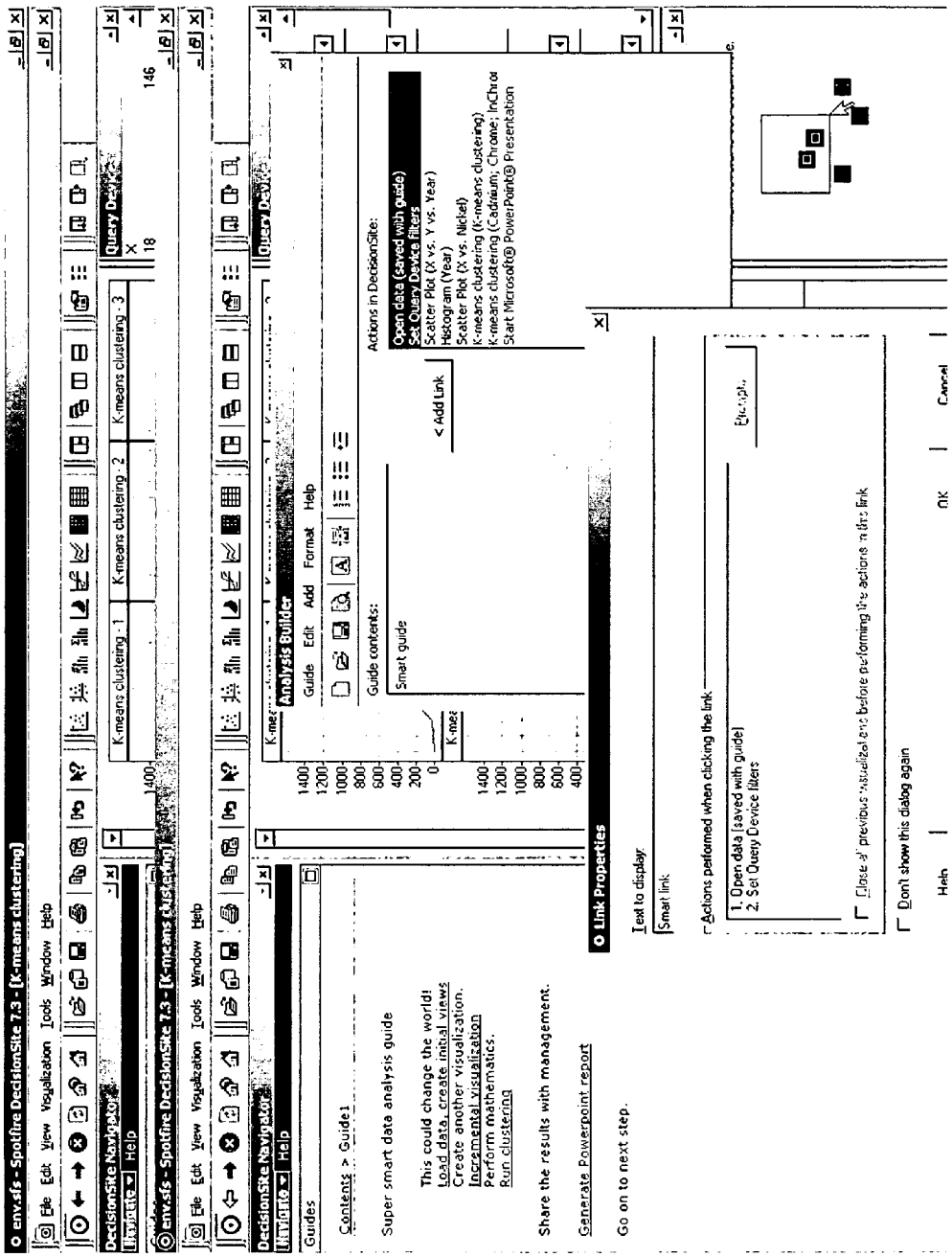
FIG. 9 shows a screen for the system of FIG. 1 with a Link Properties dialog that allows the user to add comments and links.

FIGS. 8 and 9 illustrate the operation of Analysis Builder for the exemplifying session illustrated in FIGS. 1-7. As FIG. 8 shows, the actions taken by the user have been logged, and are listed in an appropriate window. For each action, the user is given the option of adding comments and links so as to build up a guide for later use, by him- or herself or by others.

Clicking on a link in the guide initiates the actions associated with the link. Thus, clicking on the "Load data, create initial views" link (shown in the "Guide contents" pane) will "replay" and recreate the results of the actions of opening the data set (whose address/file name/locator, etc., is preferably saved along with the guide); clicking on "Incremental visualization" would cause the 3-D scatter plot to be generated; clicking on "Run clustering" directs the analysis routine to perform the four listed actions associated with K-means clustering; and "Generate PowerPoint report" generates a report in PowerPoint.

The various links, along with user-added comments, are shown in the "Guide contents" pane and can be edited using commands shown either next to the pane itself (such as the "Add link" button) or in drop-down menus on the guide building feature tool bar. The guide can then be saved in the conventional manner, preferably in a file format suitable for sending to others. As FIG. 9 shows, the saved guide can then be edited or opened later by the same or by another user.

Ways in which the user can interact with various features of this embodiment will now be described in more detail in connection with FIGS. 10-19.

The guide builder allows users to capture commonly performed analysis processes into guides, but creating guides does not require users to write a single line of code. Guides created with the guide builder can contain text and links. However, the guides can also be extended with any number of complex tasks if one has programming experience or access to a person with these types of skills.

Figure 10:
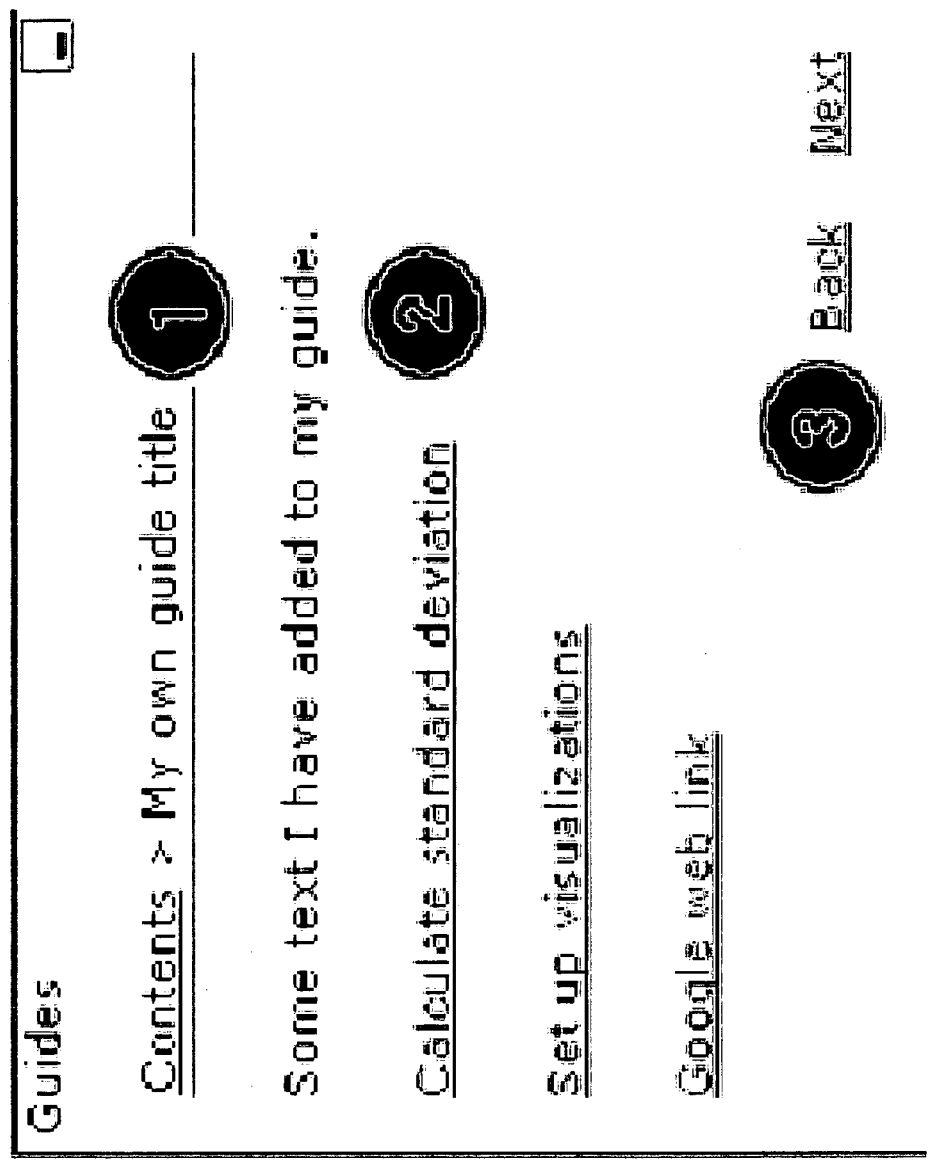
FIG. 10 shows an example of a guide for the system of FIG. 1.

An example of a guide created with the guide builder is presented in FIG. 10. A Contents and Title flight view is automatically added at the top of every guide page. It includes the Contents link followed by the guide title. The Contents link closes the guide and goes back to the main page of the Guides pane. The title of a guide can be configured via the Guide> Properties menu entry in the guide builder.

The main part of the guide includes text and links. Users can design this part of the guide by adding text and links to the guide.

Back and Next links are provided as well. These are navigation links which are automatically added at the end of every guide page. The first page of the guide gets a Next link, following pages get a Back and a Next, and the last page of the guide gets a Back and a Back to Contents link (same function as the Contents link in the flight view).

Table 1 presents a suggested workflow narrative to create a new guide using the guide builder:

TABLE 1

1. Open a data set in the system and start to perform your analysis the way that you want it to be done in the Guide.
2. If the guide builder tool is not already open, click guide builder> Create Guide in the Tools pane of the system Navigator.
3. Create the guide in the guide builder by adding links and text to the Guide contents list. By adding actions (links) to your Guide simultaneously when you perform the analysis, you can make sure that you capture the settings used this very moment. This way you can also add links that update the same visualization to several places in the Guide
4. Test the guide by selecting Guide> Run. The Guide will be displayed in the Guides pane of the system Navigator. Note that if you are testing guide steps that include opening a data set, you will clear the current Actions in DecisionSite ® list. Make sure that you have added all steps of your current analysis to the guide before testing the parts of the guide that involve switching data sets.
5. When you are finished with the Guide, select Guide> Save As . . .
6. You can now send the Guide to a colleague or to your IT department for extended functionality or deployment.

Table 2 presents a quick reference guide for the guide builder:

TABLE 2

| Action | Instruction |
|---|---|
| Start Analysis Builder | In the Tools pane of the system Navigator, under the group heading guide builder, click Create Guide. |
| Create a new guide | Click Guide> New. Edit the guide by adding text and links. |
| Edit an existing guide | Click Guide> Open . . . Browse to locate the guide that you want to edit. Edit the guide by adding or removing text and links. Tip: Run the guide prior to editing to populate the Actions in DecisionSite ® list. |
| Add text to a guide | Select Add> Text. Enter the text that you want to add in the Text Properties dialog. Click OK to close the dialog. |
| Add new actions to the Actions in DecisionSite ® list | Open a data set, run a tool or create a visualization in the system. All actions that you have performed on your current data set are logged and included in the Actions in DecisionSite ® list. |
| Add links to a guide | Make sure you have performed the action you want to add as a link in the system. Select the item or items you want to add to your guide in the Actions in DecisionSite ® list. Click < Add Link. See How the Actions in DecisionSite ® list works for more information. |
| Update an existing visualization | Add a link that creates a visualization. Add the action for the specific visualization to a new link. |
| Add a hyperlink to a guide | Double-click on a text item or select Add> Text to add a new text item. This will display the Text Properties dialog. Select the word that you want to create a hyper link from. Click on the Hyperlink button. |
| Test a guide | Select Guide> Run. Comment: The guide will be displayed in the Guides pane of the system Navigator. |
| Save a guide | Select Guide> Save. |
| Add a new page to a guide | Select Add> New Page. Comment: A flight view linking back to Contents as well as Next [page] and Back links are automatically added to each page in the Guide. |
| Minimize the Analysis Builder | Click on the top right x-button. This will hide the Analysis Builder, but both the Guide contents list and the Actions in DecisionSite ® list will be remembered when you reopen the tool. |
| Close the Analysis Builder | Select Guide> Exit. |

Note that more advanced text features can also be provided for, such as bullets, numbering, indentation, font control, bolding, and italics.

Figure 11:
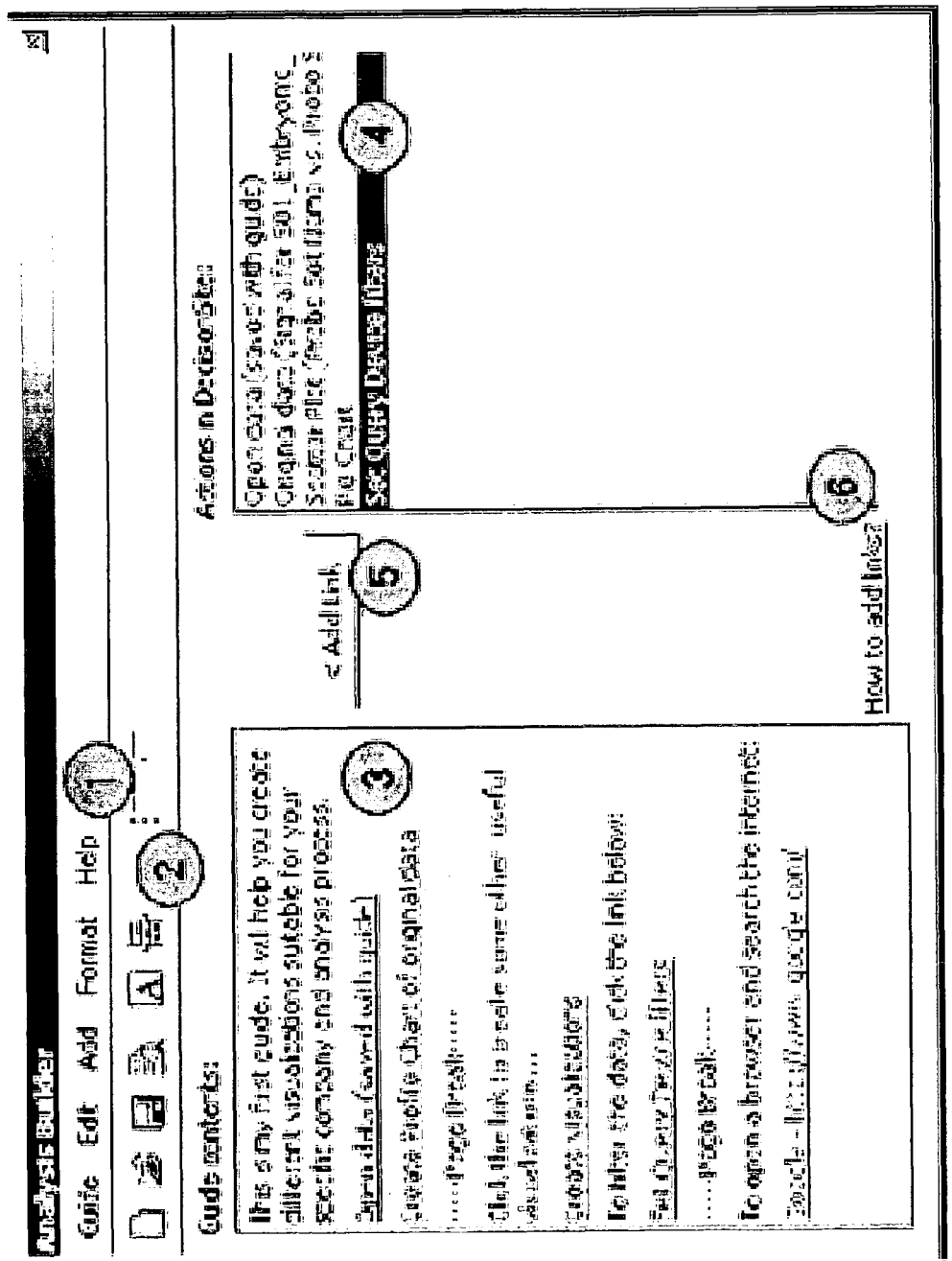
FIG. 11 shows the Analysis Builder guide building tool user interface for the system of FIG. 1.

Referring to FIG. 11, all actions in a right list called Actions in DecisionSite® can be added as a link to the guide. The user accomplishes this by clicking to select an action in the list (Ctrl allows several actions to be selected), and then clicks the<Add Link button to create a link in the guide.

Actions are automatically logged in the Actions in DecisionSite® list as they are performed by users of the system. Users first load data and perform the analysis they would normally perform. Their data, the visualizations they create, and the tools they start will appear as actions in the list. To edit a previously created guide, the user starts by running the guide in the system. This will furnish the list of actions with the data, visualizations and tools used in the guide.

Users do not have to turn on the guide builder in order for their actions to be logged. It is done automatically even if users have not started the guide builder. However, if a user logs out from the server, no actions will be logged while disconnected.

The list of actions will be emptied if the user closes his or her data via File>Close in the system. Note that the Actions in DecisionSite® list will be cleared if the user opens a new data set. Since the user can only have one data set open at a time in the system, the previous data will be closed when he or she opens the new data set. If the user logs out from the server, the guide builder will be closed and the Actions in DecisionSite® list will be cleared.

If an information link is added via the Information Library or the Information Builder, the created guide will include a reference to the information link or the actual query, respectively. If the information link is prompted, the end user of the guide will see the prompts and be able to make her own selection. The default reference is to a link on the same server, although the system can accommodate links to other servers.

The author can allow an end user of a guide to be able to choose a different information link, by instead including a link that starts the tool Information Library. To make the action Start Information Library appear in the Actions in DecisionSite® list, the user can start the tool once more after opening the information link that he or she used when creating the guide and select Cancel in the Information Library dialog.

If a data set has been opened by some other means than by opening an information link, the user will have the option to save the data with the guide. This means that the data set that the user is currently using will be a part of the guide file. This can be useful for reference data that are never changed or to create a prototype guide where some IT personnel will later on modify a guide to open data from a data source that is currently not supported by the guide builder.

The data set that is saved with the guide is the currently available data. That means that if the user has added or removed columns from the original data set prior to adding a link to a guide, the embedded data will contain the modified data set.

To save the data from an information link with the guide, e.g., for testing purposes, one can first open the information link, save the data as an SFS file in the system, the user can open the SFS file with the data and add the new action Open data (saved with guide) to the guide.

Visualizations appear in the Actions in DecisionSite® list when they are created, but the actual settings for the visualization are retrieved when a link is added to the Guide contents list. All properties are saved with the specific visualization. For example, the user can specify that a scatter plot should be created with two defined columns on the axes and with the markers colored by a third column. Query device settings (filtering), transformed columns and background images are also included in the link. It is also possible to add steps to the guide where the end user of the guide is prompted to specify which settings to use, as presented below in more detail.

Adding the Set query device filters action in a link will set all query devices and also the selected properties of the Columns tab to the current state. This means that the user can apply log scale, show or hide empty values, specify query device types and filter on specific columns without having to add a new visualization. This way, the user can create several links in the guide that update his or her visualizations, thus creating a "bookmark" kind of function. Note that if the data set that the end user of a guide is using differs from the one that the user was using while creating the guide, there might be occasions when the query device settings will not be applicable.

In the current version of the guide builder, settings are only in some cases saved with the tools. The various tool links will, most of the time, open the tool to the end user of the guide, but he or she will have to make the calculation selections and click OK in the tool dialog for him- or herself. If the authoring user wants the end users to use some specific settings in the tool, he or she should state this information as text in the guide. Some tools, e.g., the New Column from Expression tool, can be run silently (without input from the end user). When a link is added to such a tool, the user can set the Tool Option to specify whether the user wants the link to run the tool using the settings specified in the current analysis, or if the user wants to display the dialog to the end user of the guide.

It is possible and also often recommended to include several actions in a single link. For example, if the user wants the guide to open an information link and also display one or more visualizations upon clicking the link, the user can combine these actions to one link. It is important to make sure to have performed all actions that are to be included. The user then clicks to select all of the actions that should be included and clicks<Add Link. The actions will be performed in the order that they appear in the Actions in DecisionSite® list, i.e., the order in which the user performed them in his or her analysis.

While a user develops a guide, or if he or she creates guides that are for his or her own use only, the user may want to run a guide locally on his or her own computer, without giving other users access to it on the server. Table 3 is a narrative presenting steps for running a guide locally.

TABLE 3

1. In the system Navigator Guides pane, scroll to the bottom of the pane and click Run Guide . . .
   Response: An Open dialog is displayed.
   Comment: If you have access to the guide builder you can also use the link Run Guide . . . under guide builder in the Tools pane.
2. Browse to the guide file that you want to run.
   Comment: Spotfire ® Guide files (SFG) or HTML files may be opened.
3. Click Open.
   Response: The guide that you have selected is opened in the Guides pane of the the system Navigator. Follow the instructions in the guide as usual.
4. Tip: If you want to test the guide during development, select Guide>
   Run in the guide builder. This will immediately display the guide inside the Guides pane of the system Navigator. It is not necessary to save the guide prior to testing.

All properties are saved with their respective visualization when a user adds that visualization to the guide. However, there may be occasions when the authoring user may want the end user of the guide to be able to specify which columns to use on different axes, which column to color the markers by, etc., upon running the guide. Table 4 is a narrative presenting steps for prompting guide users for input.

TABLE 4

1. In the Actions in DecisionSite ® list, click to select the visualizations that you want the new link to create.
2. Make sure that Edit> Show Add Link Dialogs is selected with a check mark.
3. Click < Add Link.
   Response: The Link Properties dialog is displayed TABLE 4-continued 4. Click on the visualization action that you want to add prompting to in the Actions performed when clicking the link list.
   Response: The Prompts . . . button is activated.
   Comment: Prompting is not supported for multiple color bands in pie charts.
5. Click Prompts . . .
   Response: The Prompt for . . . dialog is displayed.
   Comment: This dialog varies depending on which type of visualization that you have selected
6. Select the check box for the things that you want the user to specify.
   Comment: Each selected object will result in the appearance of a setting selection in a dialog which is presented to the end user of the guide.
7. If desired, change the Title for input field in prompt dialog to a different title.
   Comment: This is the title that the end user of the guide will see above the selected setting.
8. Click OK.
   Response: In the Link Properties dialog, the visualization action is updated with the information [Settings modified].
9. Repeat steps 4-7 if you want to create a multiple action link with several prompt steps.
10. Click OK.
    Response: The link is added to the Guide contents list.

Table 5 presents a narrative presenting steps for prompting for input to tools.

TABLE 5

1. In the Actions in DecisionSite ® list, click to select the tool that you want the new link to start.
   Comment: See "How the Actions in DecisionSite ® List Works" on page 10 for more information on how to populate the list.
2. Make sure that Edit> Show Add Link Dialogs is selected with a check mark.
3. Click < Add Link.
   Response: The Link Properties dialog is displayed
4. Click on the tool action that you want to add prompting to in the Actions performed when clicking the link list.
   Response: The Prompts . . . button is activated.
5. Click Prompts . . .
   Response: The Tool Option dialog is displayed.
6. Select the Display the tool dialog, so the user can provide input radio button.
   Comment: For many of the tools in the system, this is the only alternative available. The number of tools that can be run silently (without input from the end user of the guide) will increase in coming releases of the guide builder.
7. Click OK.
   Response: The Tool Option dialog is closed.
8. Click OK.
   Response: The link is added to the Guide contents list.

To deploy a Guide on a server so that other users can utilize it, the user needs access to the system Developer and also needs administrator's rights on the system Server. In the system Developer is the system Builder, where guides can be incorporated into custom system applications or extensions.

Referring to FIG. 11, the guide builder interface includes the functionality listed in Table 6.

TABLE 6

1. Guide builder menus: The Guide, Edit, Add, Format and Help menus contain menu commands required to work with the guide builder.
2. Toolbar: Includes shortcuts for some of the most common commands in the guide builder. Buttons described in more detail below.
3. Guide contents: This window contains the contents of your current guide. This is where you create a new guide or modify an existing guide. Text is added by double-clicking were it says Double-click to edit text or by selecting Add> Text from the menu. Links to actions are added from the Actions in DecisionSite ® list, see below.
   You can move text items, comments, links and page breaks in the Guide contents list to the desired position using a simple drag-and-drop operation.

TABLE 6-continued

4. Actions in the system: This list contains all actions that you have performed in the system during the latest session. A session is defined as the time from when you have opened your current data set until you close it. The guide builder does not have to be started to log the events. Closing the data set will clear the action list. Select one or more actions from this list and click < Add Link to include the action (or combined action) in the guide. If you want to add an action that is currently not available in the action list, first perform the action in the system and it will immediately show up in the list.
5. Add Link: Select one or more actions from the Actions in DecisionSite ® list and click this button to include the action (or combined action) in the guide. The link will by default include the settings used in the system at the very moment you add the link. How to add links? This link opens the help file to a page with tips on how to add links to a guide.

The guide builder can be found in the Tools pane of the system Navigator, under the group heading guide builder>Create Guide.

The guide builder uses a toolbar that includes shortcuts for some of the most common commands in the menus. The user can click on the buttons on the toolbar to activate the corresponding functions. The toolbar in this embodiment is outlined in Table 7. As is well known, the toolbar buttons include icons suggestive of their functions.

TABLE 7

| Button | Function |
| --- | --- |
| NEW | Creates a new, empty guide. This resets the Guide contents window but not the Actions in DecisionSite ® list. |
| OPEN | Opens a dialog where you can select a previously saved guide file (SFG) that you can continue to work on or modify and save as a new Guide. |
| SAVE | Saves the current guide as an SFG file. |
| LAUNCH | Launches the current guide in the Guides pane of the system Navigator. It is not necessary to save the guide prior to using this command in the guide builder. Therefore, it is useful for iterative testing of the design of the guide. Note: If you are testing guide steps that include opening a data set, you will clear the current Actions in the DecisionSite ® list! Make sure that you have added all steps of your current analysis to the guide before you test the parts of the guide that involve switching data sets. |
| TEXT | Adds a new text element below the currently selected item, or, if no item is selected, at the bottom of the Guide contents list. The Text Properties dialog is displayed with the default text "Enter text here". |
| NEW PAGE | Creates a new page in the Guide. The beginning of the new page is labeled ----- Page Break ----- in the Guide contents list. |
| NUM | Adds a number before the selected text, link or comment item. Subsequently following text, link or comment items on the same guide page get the next number (2, 3 . . . ), if this button is selected. |
| BULLET | Adds a bullet before the selected text, link or comment item. |
| INDENT | Indents the selected text, link or comment item. |

Figure 12:
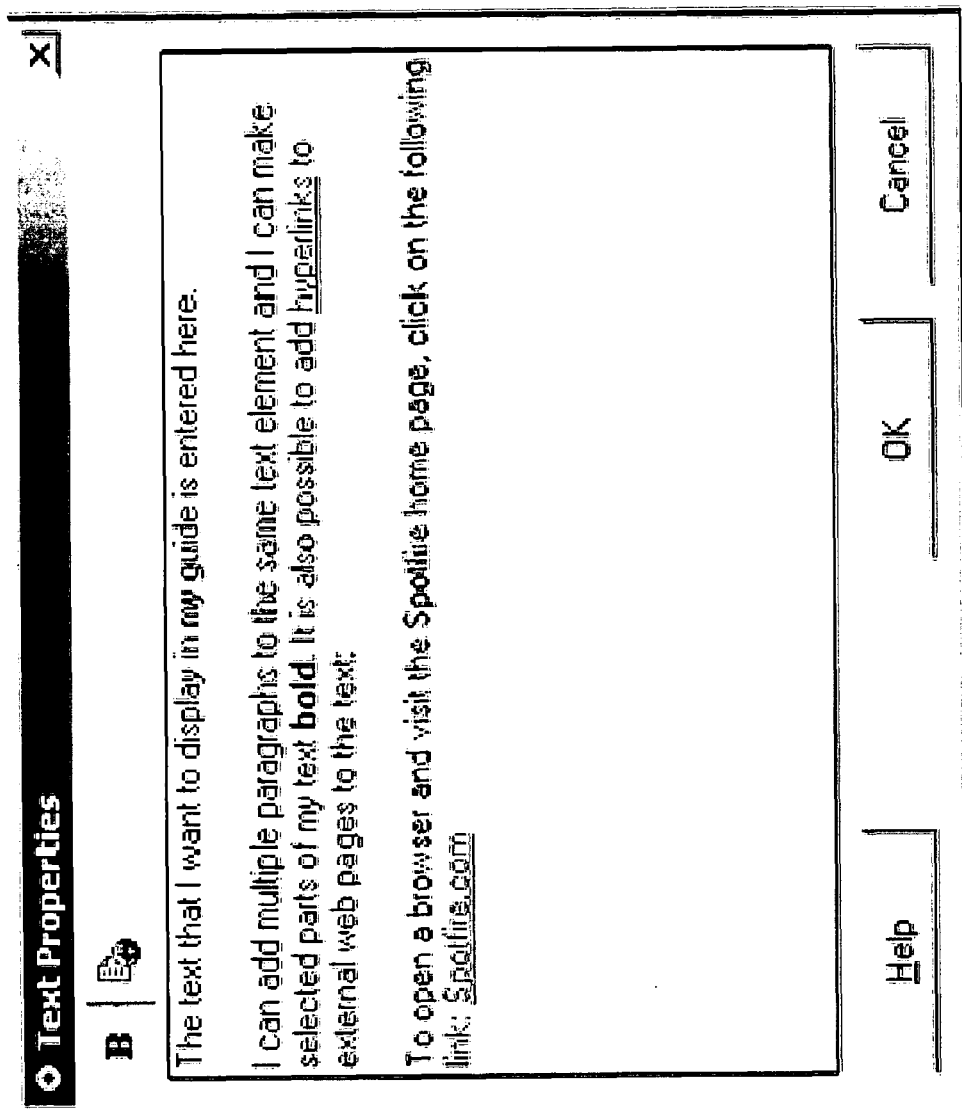
FIG. 12 shows a Text Properties dialog for the system of FIG. 1.
Figure 13:
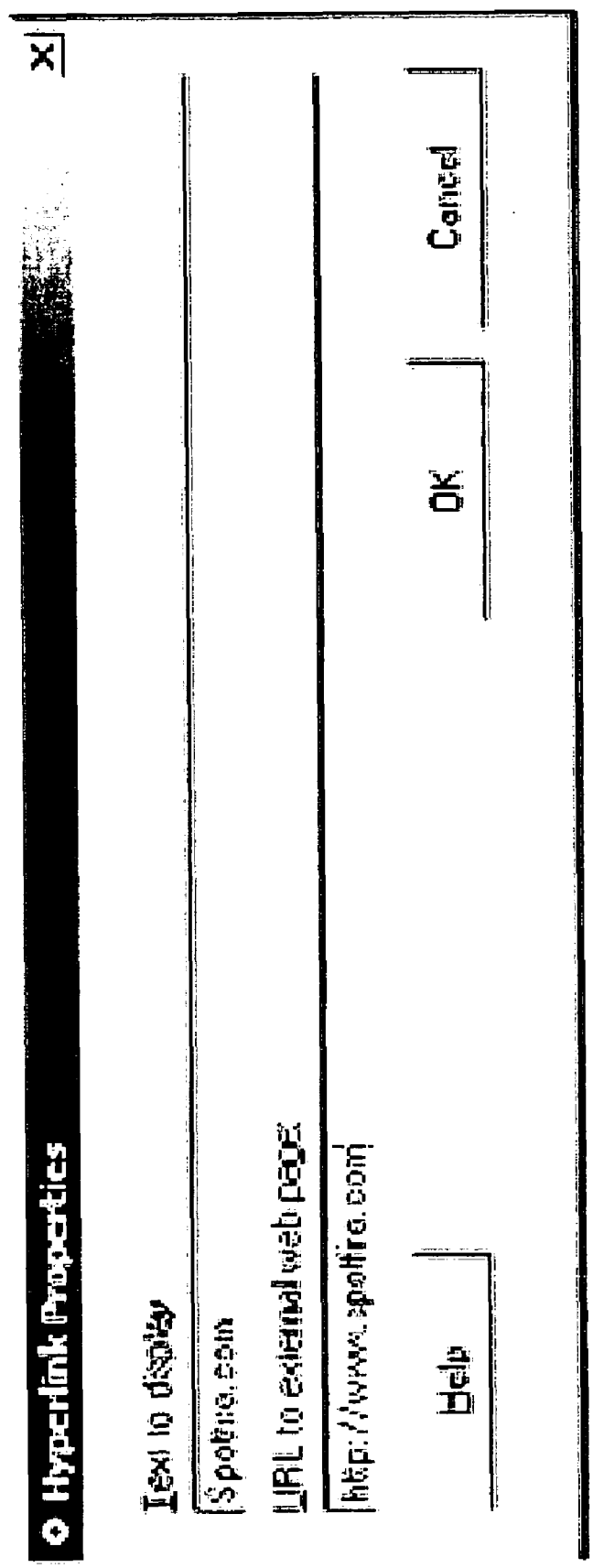
FIG. 13 shows a Hyperlink Properties dialog for the system of FIG. 1.

Referring to FIG. 12, the Text Properties dialog is used to enter and edit the text of a text element. Multiple paragraphs can be written within the same text element, bold formatting and hyperlinks can be applied to selected text. A BOLD button applies bold formatting to the selected text, and this function is also available using the short command Ctrl+B. A HYPERLINK button opens a Hyperlink Properties dialog, where a user can create a hyperlink to an external web page from the selected text, and this function is also available using the short command Ctrl+K. The Text Properties dialog is displayed when a new text element is added to the guide in the guide builder. It can also be displayed by double-clicking on a previously entered text element Referring to FIG. 13, the Hyperlink Properties dialog is used to insert hyperlinks to external web pages in the guide. The Text to Display option presents the text that will be displayed as a hyperlink (green and underlined). The URL to External Web Page option presents the address to the external web page where the user wants to go when clicking on the hyperlink. To reach the Hyperlink Properties dialog, the user selects the word that he or she wants to create a hyperlink from.

Figure 14:
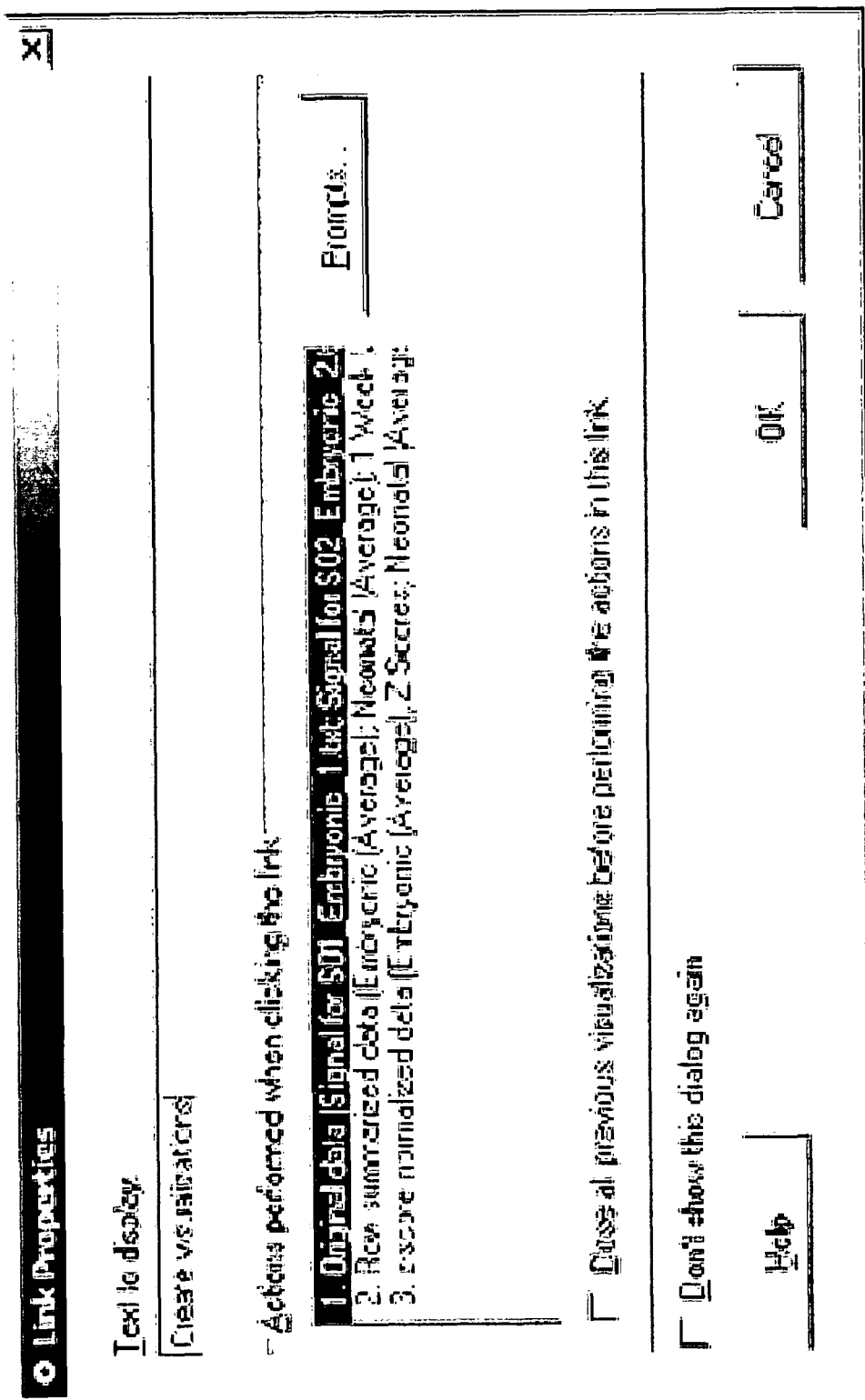
FIG. 14 shows the Link Properties dialog for the system of FIG. 1.

Referring to FIG. 14, the Link Properties dialog is specific to each link in a guide. Here, a user can edit the link text and view which actions will be performed upon clicking the link. This is especially useful if the user has created links performing multiple actions. Table 8 presents the options for this dialog.

TABLE 8

| Option | Description |
| --- | --- |
| Text to display | Edit the default text to display a link text of your choice in the new Guide. |
| Actions performed when clicking the link | Displays the actions that are part of the current link. If multiple actions are included in the link, the actions are ordered in a numbered list where the action first performed is number 1. |
| Prompts . . . | Displays the Prompt for . . . dialog, if the selected action is visualization, or the Tool Option dialog, if the selected action is a tool. |
| Close all previous visualizations before performing the actions in this link | Adds an action with the title Close all visualizations to the top of the list of actions in this dialog. This means that all visualizations that were open when the end user of the guide clicked on this link will be closed. This can be used to prevent the desktop from being cluttered with visualizations. |
| Don't show this dialog again | Select this check box if you do not want to see this dialog automatically upon adding new links. To display it again, select Edit> Show Add Link Dialogs . . . |

The Link Properties dialog is automatically displayed when a new link is added to the guide in the guide builder. If the check box Don't show this dialog again has been selected earlier, the dialog for a specific link can be displayed by double-clicking the link in the Guide contents list.

Figure 15:
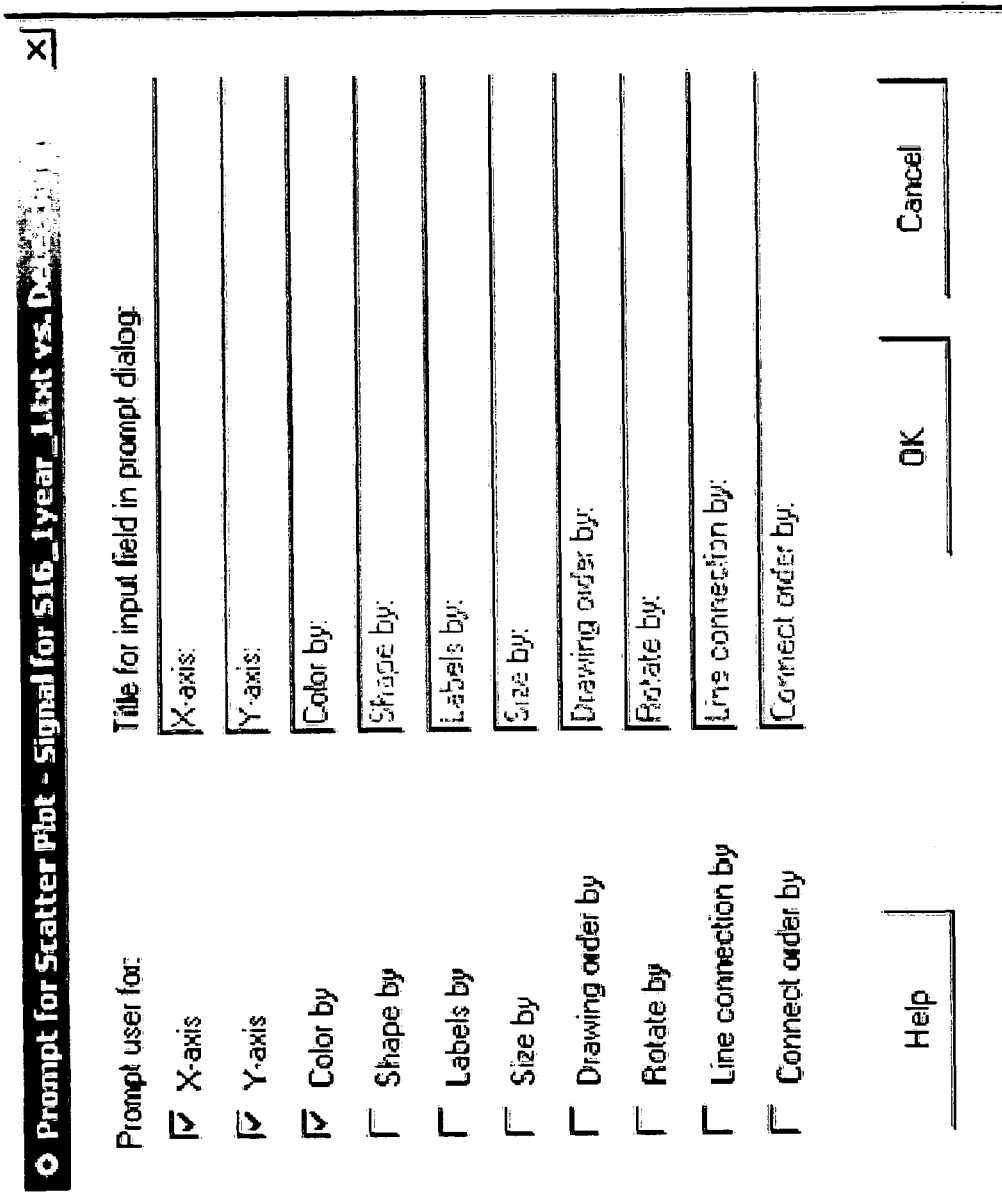
FIG. 15 shows a Prompt for . . . dialog for the system of FIG. 1.

Referring to FIG. 15, the Prompt for . . . dialog is specific to each visualization in a link. If a scatter plot has been selected (as in the example below) the dialog will be called Prompt for Scatter Plot (or whatever the title of the visualization is) and the column names of the selected axes. This dialog allows an authoring user to decide for which properties the end user of the guide should provide input.

Note that only properties that a user has used in his or her current version of the plot will be available. Hence, if the authoring user wants the end user of the guide to be able to select by which column to color by, he or she must make sure that he or she has selected some column in the Properties dialog of the visualization (in the system). Also note that prompting is not supported for multiple color bands in pie charts.

The Prompt user for option allows the user to select the check box for each of the properties that he or she wants the end user of the guide to be able to specify upon running the guide. Note that if the authoring user wants the end user of the guide to use exactly the same settings as the current visualization, he or she should not allow any prompting at all.

The Title for input field in prompt dialog allows a user to enter a descriptive title to be shown in the Settings for . . . dialog of the selected visualization. This is what the end user of the guide will see above the drop-down list for each selected property.

To reach the Prompt for . . . dialog, the user can:

1. Create visualizations and edit their properties in the system (Edit>Properties in main Spotfire® application).
2. Add a link that creates one or more visualizations to the guide.
3. In the Link Properties dialog of the desired link, click to select the visualization to add prompting for.
4. Click Prompts . . . .

Figure 16:
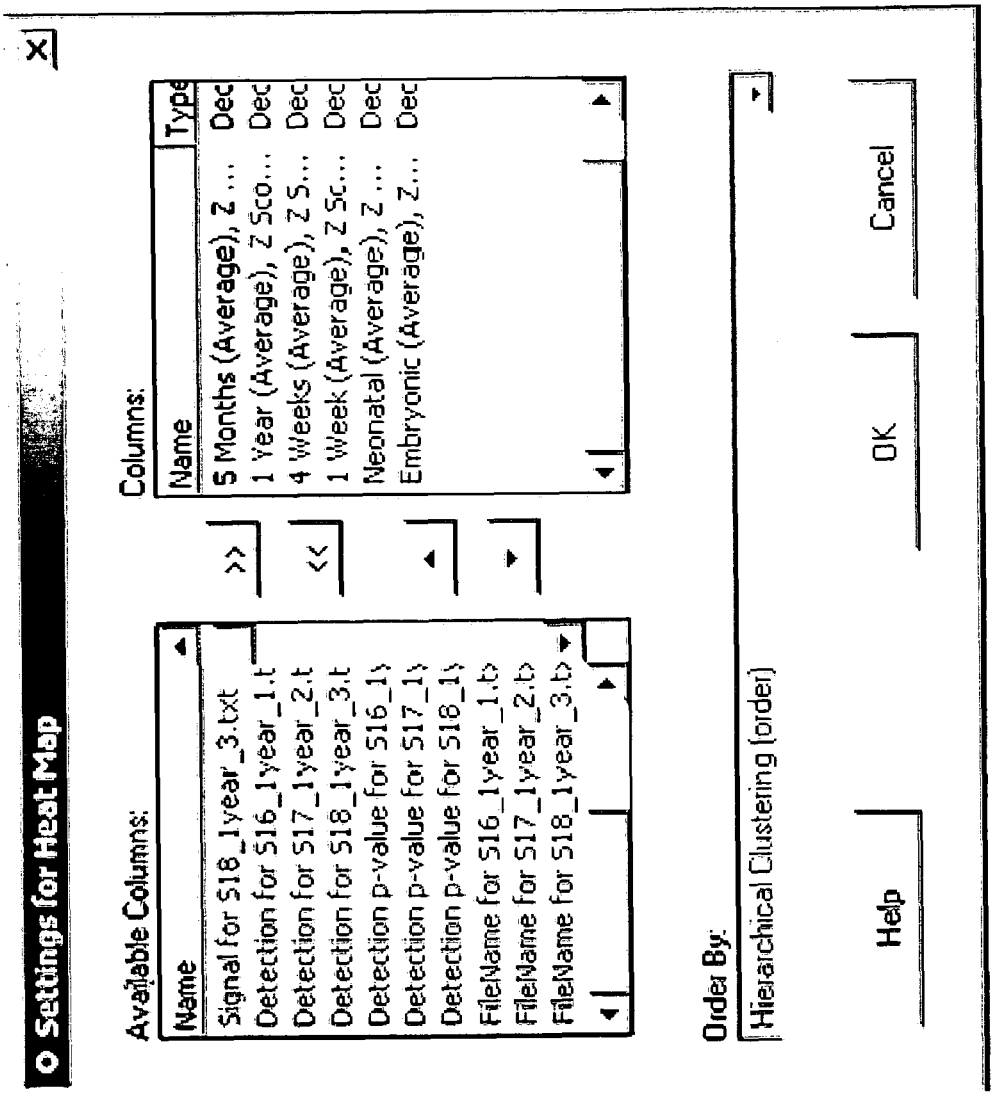
FIG. 16 shows a Settings for . . . dialog for the system of FIG. 1.

Referring to FIG. 16, the Settings for . . . dialog is displayed when running a guide that includes prompted steps. It is specific to each visualization in a link. If the user has selected a heat map, the dialog will be called Settings for Heat Map.

This dialog allows the end user of a guide to select to certain properties for a specific visualization at run-time of the guide. Only the properties specified by the creator of the guide will be available.

This dialog varies depending on both the type of visualization and the selections that the use has made in the Prompt for . . . dialog. For example, a data set containing height, weight and eye color of a group of men and women is opened in the system and two visualizations are created; The first visualization is a scatter plot with height on the x-axis and weight on the y-axis, and the markers are colored by eye color and sized by gender. The second visualization is a table showing all available columns in the data set.

A guide created using the guide builder can be edited to prompt its end user to specify certain visualization settings as indicated in FIG. 17:

To reach the Settings for . . . dialog during development of a guide, the user can:

1. Add one or more prompt steps to a visualization link using the Prompt for . . . dialog.
2. Select Guide>Run from the guide builder menu.
3. Step through the guide to locate the edited visualization link and click on it.

Figure 18:
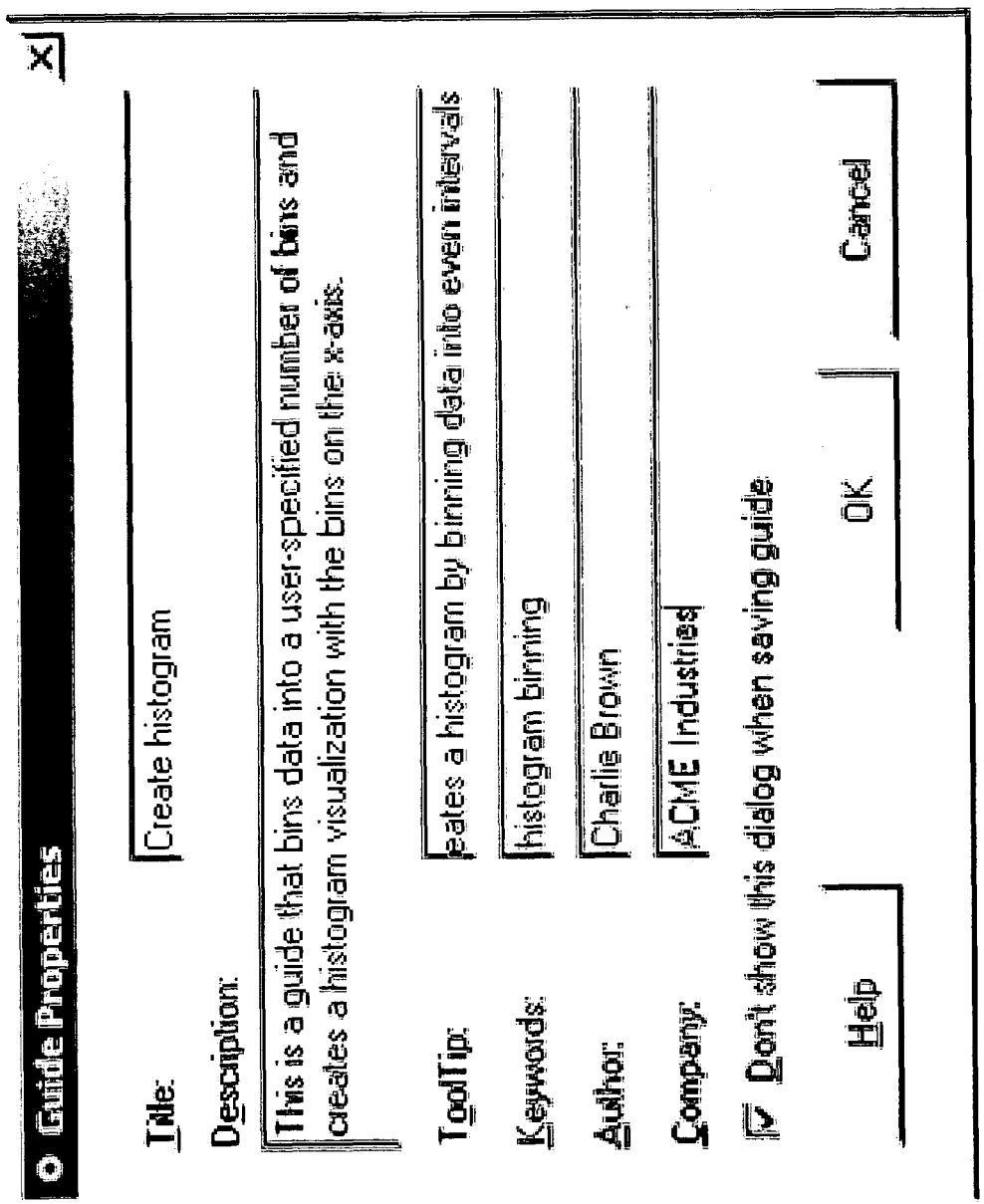
FIG. 18 shows a Guide Properties dialog for the system of FIG. 1.

Referring to FIG. 18, the Guide Properties dialog controls important properties like the title and ToolTip of the guide after it has been deployed to a server. It is recommended to fill in all fields of the Guide Properties to facilitate efficient administration of guides on the server. Options for this dialog are listed in Table 9.

TABLE 9

| Option | Description |
| --- | --- |
| Title | The title of your guide as it will be displayed in the Guides pane of DecisionSite Navigator when it is published to a server. The title is also displayed in the flight view when you are running the guide. It is important that the title is informative with regards to what the guide really does. If the guide will be published to a server, no characters other than a-z, A-Z, 0-9, ! $ ( ) , - . ; - { } and blank spaces should be used in this field due to restrictions in DS Builder. |
| Description | The title of your guide as it will be displayed in the Guides pane of DecisionSite ® Navigator when it is published to a server. The title is also displayed in the flight view when you are running the guide. It is important that the title is informative with regards to what the guide really does. If the guide will be published to a server, no characters other than a-z, A-Z, 0-9, ! $ ( ) , - . ; - { } and blank spaces should be used in this field due to restrictions in DS Builder. |
| ToolTip | A short description of the guide to be displayed as a ToolTip when you hover with the mouse pointer over the guide title in DecisionSite Navigator. Example: "Creates a histogram by binning data into even intervals" |

TABLE 9-continued

| Option | Description |
| --- | --- |
| Keywords | Keywords specific to the contents of the guide. Keywords are separated by semicolon, i.e., if you write "histogram binning" it will be interpreted as a single keyword. To produce two keywords the words must be separated with semicolon. Hence, "histogram;binning" will result in the two keywords "histogram" and "binning". |
| Author | The name of the guide author. The default value is the user name that you used when logging in to DecisionSite Server. The author name can be especially important to your IT personnel if they want to perform any changes to your guide and want to check with you that their changes are correct. |
| Company | The company for which you have created the guide. This is commonly used in the package name of the guide resource when the guide is deployed to a server. If the guide will be published to a server, no characters other than a-z, A-Z, 0-9, ! $ ( ) , - . ; - { } and blank spaces should be used in this field due to restrictions in DS Builder. |
| Don't show this dialog when saving guide | Select this check box if you do not want to see this dialog automatically when you are saving your guides. |

To reach the Guide Properties dialog: In the guide builder, the user can click Guide>Properties.

Figure 19:
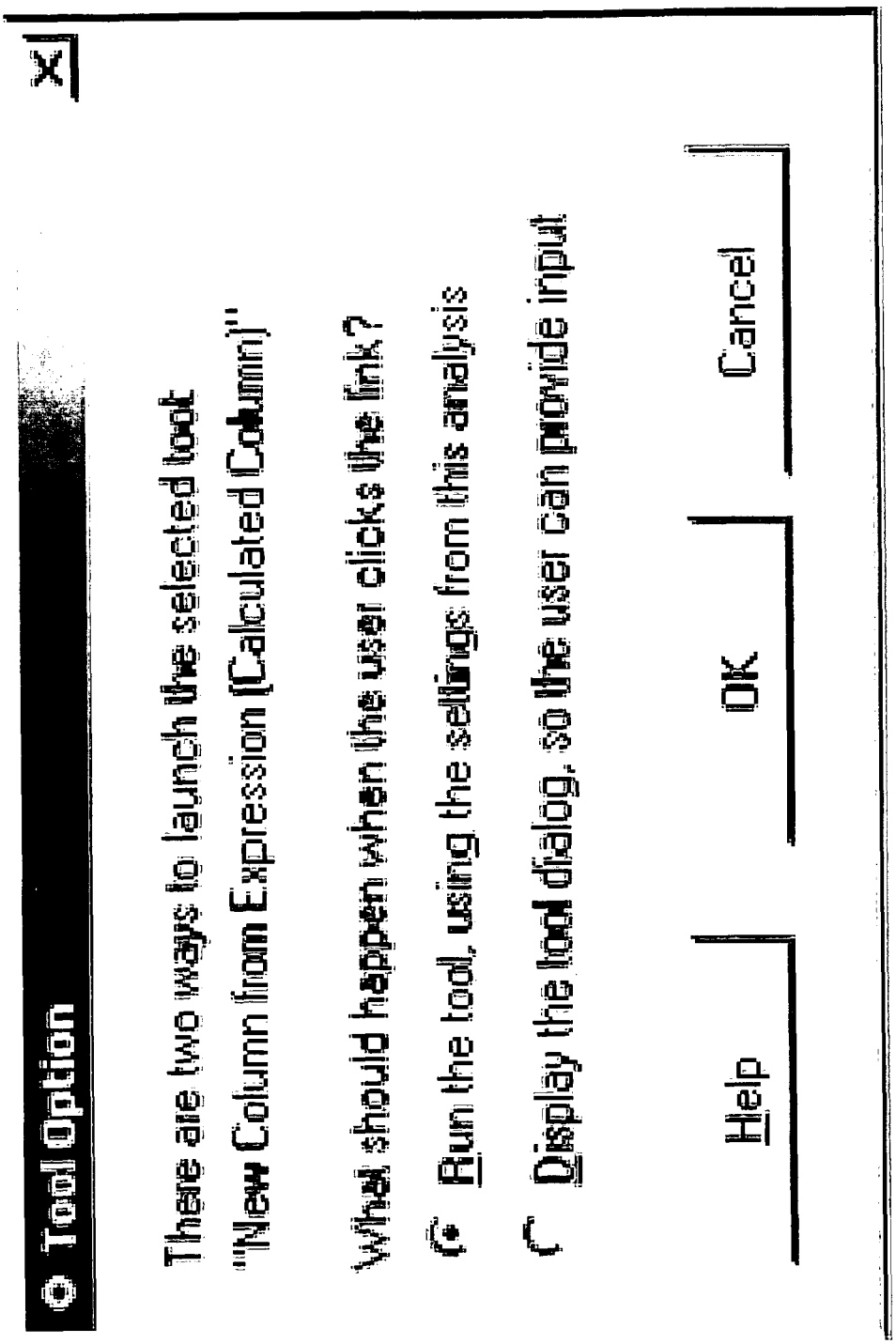
FIG. 19 shows a Tool Option dialog for the system of FIG. 1.

Referring to FIG. 19, the Tool Option dialog has two options. If the user selects Run the tool, using the settings from this analysis, the tool will be run silently (without any input from the end user of the guide) using the same analysis that the user used in his or her calculation. If the user selects Display the tool dialog, so the user can provide input, the tool is started, but the end user of the guide must provide input and click OK in the tool dialog for any calculation to be performed.

To reach the Tool Option dialog, the user can:

1. Run a tool in the system, either from the Tools pane in the system Navigator or via Edit>New Column>From Expression . . . .
2. Add a Run-the-tool link to the guide.
3. In the Link Properties dialog of the desired link, click to select the tool that you want to add prompting for.
4. Click Prompts . . . .

Note that in the current version of the guide builder, only a few tools have the possibility to be run silently.

Table 10 presents the commands in the Guide menu. The Guide menu contains commands used when working with guide files:

TABLE 10

| Option | Description |
| --- | --- |
| New | Creates a new, empty guide. This resets the Guide contents window but not the Actions in DecisionSite ® list. |
| Open . . . | Opens a dialog where you can select a previously saved guide file (SFG) that you can continue to work on or modify and save as a new Guide. |
| Save | Saves the current guide as an SFG file. |
| Save As . . . | Saves the current guide to a name and location that you specify. |
| Run | Launches the current guide in the Guides pane of the system Navigator. It is not necessary to save the guide prior to using this command in Analysis Builder. Therefore, it is useful for iterative testing of the design of the guide. Note: If you are testing guide steps that include opening a data set, you will clear the current Actions in DecisionSite ® list. Make sure that you have added all steps of your current analysis to the guide before you test the parts of the guide that involve switching data sets. |

TABLE 10-continued

| Option | Description |
| --- | --- |
| Properties | Opens the Guide Properties dialog. |
| Exit | Closes the guide builder. If the current guide has been modified, you will be prompted to save the guide. |

Table 11 presents the commands in the Edit Menu. The Edit menu contains commands used when working with Guide files:

TABLE 11

| Option | Description |
| --- | --- |
| Move Up | Moves the currently selected text, comment, link or Page Break in the Guide contents list up one step. |
| Move Down | Moves the currently selected text, comment, link or Page Break in the Guide contents list down one step. |
| Delete | Deletes the selected text, comment, link or Page Break from the Guide contents list. You can also press Delete on your keyboard to perform the same function. |
| Text Properties | Displays the Text Properties dialog. Comments are directly opened for editing by double-clicking on the comment. |
| Link Properties | Displays the Link Properties dialog. |
| Show Add Link Dialogs | Shows or hides the Link Properties dialogs that are displayed when you add a link from the Actions in DecisionSite ® list. |

Table 12 presents the commands in the Add Menu. The Add menu contains the following commands:

TABLE 12

| Option | Description |
| --- | --- |
| Text | Opens the Text Properties dialog where you can enter a new text which will be inserted below the currently selected item, or, if no item is selected, at the bottom of the Guide contents list. The Text Properties dialog is displayed with the default text "Enter text here", |
| New Page | Creates a new page in the Guide. The beginning of the new page is labeled -----Page Break----- in the Guide contents list. |
| Comment | Adds a new text box with text in italics below the currently selected item, or, if no item is selected, at the bottom of the Guide contents list. The new comment item is displayed with the default text "Click to add comment". The purpose of comments is normally to indicate that something in this guide should be changed or added by the IT department of the guide creators company. Therefore, comments should normally be removed before the guide is deployed to all users. |

Table 13 presents the commands in the Format Menu. The Format Menu contains the following commands:

TABLE 13

| Option | Description |
| --- | --- |
| Numbered | Adds a number before the selected text, link or comment item. Subsequently following text, link or comment items on the same guide page get the next number (2, 3 . . . ), if this button is selected. |
| Bulleted | Adds a bullet before the selected text, link or comment item. |
| Indented | Indents the selected text, link or comment item. |

The Help menu opens a help file to the guide builder Overview. Table 14 presents the commands for the Pop-up Menu. The pop-up menu is displayed upon right-clicking on an item in the Guide contents list and contains the following commands:

TABLE 14

| Option | Description |
| --- | --- |
| Move Up | Moves the currently selected text, comment, link or Page Break in the Guide contents list up one step. |
| Move Down | Moves the currently selected text, comment, link or Page Break in the Guide contents list down one step. |
| Delete | Deletes the selected text, comment, link or Page Break from the Guide contents list. You can also press Delete on your keyboard to perform the same function. |
| Text Properties | Displays the Text Properties dialog. Comments are directly opened for editing by double-clicking on the comment. |
| Link Properties | Displays the Link Properties dialog. |

The system in this embodiment advantageously provides a graphical application that can be either integrated into or will cooperate with data analysis and visualization software, that can log user actions automatically but have the flexibility to allow user control, that is easy to use, requires little if any special training, and that can serve as a guide for others. It will also be apparent to one of ordinary skill in the art that the illustrative system provides an environment in which users can directly record actions, modify guides, and run them, without having to first compile them or switch between application interfaces. Instead, both the authoring interface and the user interface are independently accessible at the same time. This allows users to build guides in an intuitive set of try-and-modify iterations.

Unlike conventional programming languages that are based on parsed sequences, the system of the invention uses action-tokens. An action-token is an independently executable element that can only be divided into other independently executable elements, if it can be divided at all. The use of such tokens allows even inexperienced users to safely manipulate them without resulting in syntax errors. This is quite different from allowing an inexperienced user to manipulate conventional programming code, where a single miscapitalized letter or a misplaced semicolon can cause errors that effectively prevent its execution.

The system stores the guides as built by users in the form of XML and HTML hypertext files, but other representations could of course also be used. The use of standard hypertext scripting languages can allow more technically skilled users to directly modify the guides by deleting logged code, modifying logged code, or adding new code. Users can even add code that uses other programming languages, such as Windows® native scripting language, or javascript.

It will also be apparent to one of ordinary skill in the art that while the system is implemented in a software running on a Microsoft Windows® platform, that other implementations are possible using different software and hardware platforms.

The system can also support hierarchical action entries. These allow users to "drill down" into operations and make more granular choices. The user can select a scatter plot creation command (<Create Scatterplot>) in a guide, for example, and then expand it into a list of sub-actions such as:
[Set size]
[Set X-axis]
[Set Y-axis]
[Set color]
The user can then select the set color sub-action and expand it to obtain a [modify color scheme] sub-sub-action. This action can then be used in a guide by itself.

In another example, the user can expand a <Set query device settings> action as follows:

```
<Set query device setings>        [Expand]
   [Set Year range]
   [Set Age range]                [Expand]
      [Move Year lower range to 10]
      [Move Age upper ranger to 25]
```

The user can then pick the [Move Year lower range to 10] action and add it to a guide.

The user can instruct the system to perform the expansion operations in a variety of conventional ways, such as double-clicking on the action, actuating an expand button with the action selected, or actuating a dedicated expand control for the action (e.g., a "+"). The system can display the expanded actions in a variety of different ways as well, such as a separate pop-up window, or in an outline view that allows multiple actions to be viewed in expanded form at the same time.

The hierarchical nature of the system also allows tokens to be combined into larger tokens. It follows that a guide is also a kind of token and can be used as an element in other guides.

The system can also include a more traditional macro interface to supplement its guide functionality. This macro interface would enable more advanced users to create more highly-tailored macros that could then be included in guides. This functionality can use a traditional programming language interface that is based on a series of user-editable parsed statements. Such an interface could resemble the well-known Microsoft Visual Basics interface, for example. The system can also include some more advanced programming controls, such as simple gating statements (e.g., branching, testing, or error detection).

The present invention has now been described in connection with a number of specific embodiments thereof. However, numerous modifications which are contemplated as falling within the scope of the present invention should now be apparent to those skilled in the art. For example, while the embodiment presented above is applied to data analysis software that has advanced visualization capabilities, guides could also be employed in less visually-oriented data analysis systems such as accounting programs, statistical packages (e.g., SPSS®), or spreadsheets. And software without analysis features, such as word processors or contact management programs may also benefit from guide-based automation according to the invention. It is therefore intended that the scope of the present invention be limited only by the scope of the claims appended hereto. In addition, the order of presentation of the claims should not be construed to limit the scope of any particular term in the claims.

What is claimed is:

1. A computer-based system comprising a processor and a storage device including instructions that are operative to run on the processor for analyzing data from a database, comprising:
    a data analysis user interface responsive to user interaction to initiate a plurality of different types of actions on the data,
    an action logging interface operative to create a logged sequence of the different types of actions as the user initiates them through the data analysis user interface, and
    a token-based authoring user interface operative to display to the user a list of different user interface action tokens corresponding to the different types of actions logged by the action logging interface in the sequence,
    wherein the token-based authoring user interface is operative to present the different user interface action-tokens in the list as individual items that can each be selected as a unit in the authoring user interface by an individual pointing-device-based user selection command,
    wherein the token-based authoring system is responsive to the pointing-device-based user selection commands to individually select as a unit from the list at least some of the user interface action-tokens corresponding to the user initiated actions logged by the action logging interface to create an authored set of actions, and
    wherein the token-based authoring user interface is operative to allow the user to reorder the list of user interface action-tokens using the pointing-device-based commands on the user interface action-tokens that select them each as an individual unit to create an authored sequence of the actions of different types that is different from the logged sequence of the actions of different types.

2. The system of claim 1 wherein the authoring user interface includes one or more sequencing controls that operate on the action-tokens.

3. The system of claim 2 wherein at least one of the sequencing controls is a selection control operative to select a subset of the logged actions for inclusion in a guide series.

4. The system of claim 1 wherein the authoring interface includes a selection control operative to select a subset of the logged actions for inclusion in a guide series.

5. The system of claim 1 wherein the authoring interface includes a grouping control operative to identify groups of actions.

6. The system of claim 5 wherein the authoring interface includes a group naming control operative to name groups of actions identified by the authoring interface.

7. The system of claim 1 further including a guide display operative to display at least a portion of the authored set of actions.

8. The system of claim 1 wherein the authoring interface includes a gating control operative to insert one or more gating constructs into the authored sequence.

9. The system of claim 1 wherein the authoring interface includes sequencing controls that are responsive to actuation by a pointing device.

10. The system of claim 9 wherein the sequencing controls include drop-and-drag controls.

11. The system of claim 9 wherein the sequencing controls include move up and move down controls.

12. The system of claim 1 wherein the authoring interface includes annotation controls responsive to user input to associate user-authored textual annotations to actions in the different sequence.

13. The system of claim 12 wherein the textual annotations are visible in a user interface window.

14. The system of claim 1 wherein the logging is operative at startup of the system.

15. The system of claim 1 wherein the logging is independent of any user logging initiation command.

16. The system of claim 1 further including a macro interface that performs actions in response to a parsed series of user-editable statements.

17. The system of claim 1 wherein the system includes a library operative to provide access to a plurality of the authored sequences by more than one user.

18. The system of claim 17 wherein at least some of the authored sequences are designated through the server as best practice sequences.

19. The system of claim 17 wherein the authoring interface is operative to save authored sets to the library and retrieve them from the library for further authoring.

20. The system of claim 1 wherein the authoring interface is operative to save authored sets and retrieve them for further authoring.

21. The system of claim 1 wherein the authoring interface permits users to create authored sequences with references outside of the data analysis system.

22. The system of claim 21 wherein the authoring interface permits users to create authored sequences with references outside of the data analysis system in which selected data are passed from the data analysis system.

23. The system of claim 21 wherein the authoring interface permits users to create authored sequences with references to outside services that return information to the data analysis system.

24. The system of claim 21 wherein the authoring interface permits users to create authored sequences with references outside of the data analysis system in which selected data are passed from the data analysis system to an outside service and a result is returned from that service for the selected data.

25. The system of claim 1 further including an application programming interface that defines a standard for supporting additional actions in the system and wherein the additional actions can be logged and referenced in authored sequences.

26. The system of claim 1 wherein the authoring interface permits users to insert hyperlinks to items other than actions into the authored sequence.

27. The system of claim 1 wherein the authoring interface permits users to insert references to data to be operated on by the system into the authored sequence.

28. The system of claim 27 wherein the authoring interface permits users to insert into the authored sequence references to data in the database to be operated on by the system.

29. The system of claim 27 wherein the authoring interface permits users to insert prompts for selection of variables into the authored sequence.

30. The system of claim 1 wherein the system includes a state engine that stores application states.

31. The system of claim 1 wherein the data analysis system includes spreadsheet functionality.

32. The system of claim 1 wherein the data analysis system includes interactive data visualization functionality.

33. The system of claim 1 wherein the data analysis system is a statistical package that includes a plurality of advanced statistical functions.

34. The system of claim 33 wherein the statistical analysis package includes at least two of the following advanced statistical functions: regression, correlation, and analysis of variance.

35. The system of claim 1 wherein the system is operative independent of any user-initiated compile command.

36. The system of claim 1 wherein the authoring interface and the user interface are both independently accessible at the same time.

37. The system of claim 1 wherein the authoring interface is further responsive to user comment command input to insert end-user-readable comments into the authored set of actions.

38. The system of claim 1 wherein the authoring interface is responsive to user commands to insert page delimiters in the authored set of actions.

39. The system of claim 38 wherein the authoring interface includes automatic page navigation logic operative to insert navigation links between pages in response to the insertion of page delimiters.

40. The system of claim 1 wherein the authored set of actions is stored as a structured document.

41. The system of claim 1 wherein the authored set of actions is stored in a structured text format that can be modified by the end user.

42. The system of claim 1 wherein the action-tokens can be hierarchical and can include other action-tokens.

43. The system of claim 1 wherein the database is stored as a delimited file.

44. A data analysis method for analyzing data from a database, comprising:
   responding through a data analysis interface to user interaction to initiate a plurality of different types of actions on the data,
   automatically logging through an action logging interface a sequence of different types of data analysis actions on data from the database as they are initiated by a user,
   associating user interface action-tokens with each of the actions logged in the step of automatically logging,
   presenting the displaying through a token-based authoring user interface to the user a list of different user interface action tokens associated with the different types of actions logged by the step of automatically logging, wherein the step of displaying presents the different user interface action-tokens to the user in the list as individual items that can each be selected as a unit by an individual pointing-device-based user selection command,
   receiving pointer-based, token-based user selection commands from the user, to individually select as a unit from the list at least some of the user interface action-tokens corresponding to the user-initiated actions logged in the step of automatically logging, and
   in response to the step of receiving storing, an authored sequence of the actions of different types selected by the user having a different order than the logged sequence of action-token-based authoring commands that were logged by the step of automatically logging.

45. A computer-based system comprising a processor and a storage device including instructions that are operative to run on the processor for analyzing data from a database, comprising:
   data analysis interface means for responding to user interaction to initiate a plurality of different types of actions on the data,
   action logging interface means for automatically logging a sequence of different types of data analysis actions on data from the database as they are initiated by a user,
   means for associating user interface action-tokens with each of the actions logged by the means for automatically logging,
   means token-based authoring user interface means for displaying to the user a list of different user interface action tokens associated with the different types of actions logged by the means for automatically logging, and for presenting the different user interface action-tokens to the user in the list as individual items that can each be selected as a unit by an individual pointing-device-based user selection command,
   means for receiving pointer-based, token-based user selection commands from the user, to individually select as a unit from the list at least some of the user interface action-tokens corresponding to the user-initiated actions logged by the means for automatically logging, and means for storing in response to the step of receiving, an authored sequence of the actions of different types selected by the user having a different order than the logged sequence of action-token-based authoring commands that were logged by the means for automatically logging.

46. The system of claim 1 further including a library operative to provide access to authored sequences created by the token-based authoring user interface by a user different from the user who created them.

47. The method of claim 44 further including the step of running the stored authored sequence of actions by another user.

48. The system of claim 44 further including means for running the stored authored sequence of actions by another user.

49. The system of claim 1 wherein the system is further operative to run the stored authored sequence of actions.

50. The system of claim 1 wherein the data analysis user interface is responsive to user interaction to initiate a plurality of different types of actions on the data that include selecting a visualization type and setting a query device filter, wherein the action logging interface is operative to create a logged sequence of different types of actions that include selecting a visualization type and setting a query device filter, and wherein the token-based authoring user interface is operative to display to the user a list of different user interface action-tokens corresponding to the different types of actions, including selecting a visualization type and setting a query device filter, logged by the action logging interface in the sequence.

51. The system of claim 50 wherein the system is further operative to run the stored authored sequence of actions.

* * * * *